United States Patent
Li et al.

(10) Patent No.: US 11,368,187 B2
(45) Date of Patent: Jun. 21, 2022

(54) DATA TRANSMISSION METHOD AND APPARATUS

(71) Applicant: HUAWEI TECHNOLOGIES CO., LTD., Guangdong (CN)

(72) Inventors: Zhenyu Li, Beijing (CN); Yang Nan, Beijing (CN); Wurong Zhang, Shenzhen (CN); Jinxia Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 16/883,233

(22) Filed: May 26, 2020

(65) Prior Publication Data

US 2020/0287589 A1 Sep. 10, 2020

Related U.S. Application Data

(63) Continuation of application No. PCT/CN2017/113211, filed on Nov. 27, 2017.

(51) Int. Cl.
- *H04B 1/7143* (2011.01)
- *H04L 1/16* (2006.01)
- *H04W 72/04* (2009.01)

(52) U.S. Cl.
CPC ......... *H04B 1/7143* (2013.01); *H04L 1/1642* (2013.01); *H04W 72/0446* (2013.01)

(58) Field of Classification Search
CPC . H04B 1/7143; H04L 1/1642; H04W 72/0446
See application file for complete search history.

(56) References Cited

U.S. PATENT DOCUMENTS

| 7,035,314 B1 | 4/2006 | Linsky |
| 9,077,444 B2 | 7/2015 | Dewasurendra et al. |

(Continued)

FOREIGN PATENT DOCUMENTS

| CN | 1994015 A | 7/2007 |
| CN | 102404751 A | 4/2012 |

(Continued)

OTHER PUBLICATIONS

ETSI EN 300 328 V2.1.1 (Nov. 2016), "Wideband transmission systems; Data transmission equipment operating in the 2,4 GHz ISM band and using wide band modulation techniques; Harmonised Standard covering the essential requirements of article 3.2 of Directive 2014/53/EU," Nov. 2016, 101 pages.

(Continued)

*Primary Examiner* — Jay P Patel

(74) *Attorney, Agent, or Firm* — Fish & Richardson P.C.

(57) ABSTRACT

This application provides a data transmission method and apparatus. The method includes: determining a first frequency hopping pattern and a second frequency hopping pattern, wherein the first frequency hopping pattern and the second frequency hopping pattern comprises a same index set of N indexes corresponding to N channels; sending, based on the first frequency hopping pattern, data in each time unit of a first time period by using one of the N channels; and sending, based on the second frequency hopping pattern, data in each time unit of a second time period by using one of the N channels, wherein the first period and the second period are consecutive time periods each comprising N time units, each time unit starts and ends at starting times of two adjacent channels.

12 Claims, 7 Drawing Sheets

(56) References Cited

U.S. PATENT DOCUMENTS

| | | | | |
|---|---|---|---|---|
| 10,158,446 | B2* | 12/2018 | Seyama | H04L 5/0007 |
| 10,548,125 | B2* | 1/2020 | Xu | H04W 76/14 |
| 2009/0262712 | A1* | 10/2009 | Seyama | H04L 27/2655 |
| | | | | 370/336 |
| 2014/0073356 | A1* | 3/2014 | Siomina | G01S 5/0205 |
| | | | | 455/456.2 |
| 2017/0134199 | A1* | 5/2017 | Wang | H04B 1/713 |
| 2018/0131483 | A1* | 5/2018 | Somichetty | H04B 1/713 |
| 2018/0279296 | A1* | 9/2018 | Hosseini | H04L 5/001 |
| 2018/0359715 | A1* | 12/2018 | Abedini | H04W 56/0005 |
| 2019/0045372 | A1* | 2/2019 | Niu | H04W 16/14 |
| 2020/0186188 | A1* | 6/2020 | Li | H04B 1/7156 |
| 2020/0336973 | A1* | 10/2020 | Niu | H04L 5/0053 |
| 2021/0058206 | A1* | 2/2021 | Ye | H04L 5/0012 |
| 2021/0105821 | A1* | 4/2021 | Niu | H04B 1/713 |

FOREIGN PATENT DOCUMENTS

| | | | |
|---|---|---|---|
| CN | 103944606 A | 7/2014 | |
| EP | 3340661 A1 * | 6/2018 | H04W 72/042 |
| WO | 9919993 A1 | 4/1999 | |

OTHER PUBLICATIONS

3GPP TS 36.104 V15.0.0 (Sep. 2017),3rd Generation Partnership Project,Technical Specification Group Radio Access Network,Evolved Universal Terrestrial Radio Access (E-UTRA),Base Station (BS) radio transmission and reception(Release 15), 243 pages.

3GPP TS 36.211 V14.4.0 (Sep. 2017),3rd Generation Partnership Project,Technical Specification Group Radio Access Network,Evolved Universal Terrestrial Radio Access (E-UTRA),Physical channels and modulation(Release 14), 198 pages.

3GPP TS 36.213 V14.4.0 (Sep. 2017),3rd Generation Partnership Project,Technical Specification Group Radio Access Network,Evolved Universal Terrestrial Radio Access (E-UTRA),Physical layer procedures(Release 14), 461 pages.

3GPP TS 36.331 V13.7.1 (Sep. 2017),3rd Generation Partnership Project,Technical Specification Group Radio Access Network,Evolved Universal Terrestrial Radio Access (E-UTRA),Radio Resource Control (RRC),Protocol specification(Release 13), 642 pages.

PCT International Search Report and Written Opinion in International Application No. PCT/CN2017/113,211, dated Jan. 9, 2018, 17 pages (With English Translation).

Extended European Search Report issued in European Application No. 17932575.8 dated Nov. 3, 2020, 9 pages.

Haartsen et al., "Frequency hop selection in the Bluetooth radio system," IEEE Seventh International Symposium on Spread Spectrum Techniques and Applications, Dec. 10, 2002, 5 pages.

Morsi et al., "Performance estimation and evaluation of Bluetooth frequency hopping selection kernel," 2009 Joint Conferences on Pervasive Computing (JCPC), Feb. 25, 2010, 6 pages.

Wu et al., "Anti-Interference Performance Analysis in Bluetooth Frequency Hopping System," 2007 International Workshop on Anti-Counterfeiting, Security and Identification (ASID), Jun. 18, 2007, 4 pages.

Office Action issued in Chinese Application No. 201780096785.9 dated Nov. 23, 2020, 9 pages.

\* cited by examiner

DATA TRANSMISSION METHOD AND APPARATUS

CROSS-REFERENCE TO RELATED APPLICATIONS

This application is a continuation of International Application No. PCT/CN2017/113211, filed on Nov. 27, 2017, the disclosure of which is hereby incorporated by reference in its entirety.

TECHNICAL FIELD

This application relates to the field of internet of things communications technologies, and in particular, to a data transmission method and apparatus.

BACKGROUND

Frequency hopping communication is a branch of spread spectrum communication, and an advantage of the frequency hopping communication is strong anti-interference performance. The frequency hopping communication is a communication mode in which both a transmit end and a receive end change frequencies synchronously, and a carrier frequency keeps hopping during the communication. During the frequency hopping communication, the transmit end and the receive end need to use a same frequency hopping sequence, and the frequency hopping sequence may include indexes of a plurality of channels. When performing frequency hopping, the transmit end and the receive end may use the channels corresponding to the indexes to receive and send data.

Bluetooth communication uses the frequency hopping communication to resist channel interference. A carrier frequency hopping sequence of a transmitter in the bluetooth communication is determined by a pseudo-random frequency hopping sequence. Each piconet (Piconet) has a unique frequency hopping sequence. Bluetooth uses a 2.4 GHz industrial scientific medical (industrial scientific medical, ISM) frequency band. 79 channels are obtained through division from 2.402 GHz to 2.480 GHz frequency bands (where bandwidth of each channel is 1 MHz), and an average rate is 1600 hops per second.

The enhanced machine type communication on unlicensed spectrum (enhanced machine type communication on unlicensed spectrum, eMTC-U) is a machine type communication technology working on unlicensed spectrums. A main objective of the eMTC-U is to implement long-distance, low-cost, and low-power-consumption internet of things communication. Non-adaptive frequency hopping is used for uplink sending of the eMTC-U, and a main working frequency is 2.4 GHz. The eMTC-U can also be extended to another unlicensed spectrum.

Currently, the eMTC-U uses a frequency hopping communication solution in the bluetooth communication, and a carrier frequency hopping sequence of a transmit end device in the eMTC-U is determined by a pseudo-random frequency hopping sequence. Because spectrums are the basis of wireless communication, to ensure fair use of the spectrums, different countries have formulated different laws and rules. After the eMTC-U uses the frequency hopping communication solution in the bluetooth communication, because a quantity of frequency hopping times is relatively small, it cannot be ensured that a use time of each channel is equal. When some channels are used for a plurality of times in a frequency hopping manner, the laws and rules of the countries may not be complied with. For example, a rule that an average occupation time of each channel should not exceed 400 ms may not be complied with. In other words, when some channels are used for a plurality of times in a frequency hopping manner, the average occupation time may exceed 400 ms.

SUMMARY

Embodiments of this application provide a data transmission method and apparatus, to satisfy a requirement of laws and rules and ensure equal use of channels.

According to a first aspect, an embodiment of this application provides a data transmission method. The method includes:

determining a first frequency hopping pattern and a second frequency hopping pattern, where an index set included in the first frequency hopping pattern is the same as an index set included in the second frequency hopping pattern, the index set includes N indexes, the N indexes have a one-to-one correspondence with N channels used for sending data, and the first frequency hopping pattern and the second frequency hopping pattern are different; and sending, based on the first frequency hopping pattern, data in each time unit of a first period by using one of the N channels, and sending, based on the second frequency hopping pattern, data in each time unit of a second period by using one of the N channels, where the first period is adjacent to the second period, the first period and the second period each include N time units, the time unit is a time interval between start moments of two adjacent channels, indexes of channels used in any two time units of the first period are different, indexes of channels used in any two time units of the second period are different, and N is a positive integer greater than 0.

Because a transmit end device sends, based on a frequency hopping pattern, data in each time unit of one period by using one channel, and indexes of channels used in any two time units of a same period are different, each channel can be accessed and can be accessed only once, and therefore, that a time length of accessing each channel complies with a related law and rule is ensured, and equal use of the channels is ensured.

In a possible design, the determining a first frequency hopping pattern and a second frequency hopping pattern includes: determining the first frequency hopping pattern and the second frequency hopping pattern based on a permutation function, an input sequence of the permutation function, and a control word, where the input sequence of the permutation function is determined based on time information of a system, a physical cell identifier (physical cell identifier, PCI), and a quantity of channels, and when the permutation function is a 5-bit permutation function and the quantity of channels is 16, a bit of the control word that is corresponding to a most significant bit of the input sequence of the permutation function is set to 0.

The transmit end device determines the frequency hopping patter based on the permutation function, the input sequence of the permutation function, and the control word, so that a case in which the frequency hopping pattern occupies too much storage space is avoided, and storage space overheads are reduced.

In a possible design, the determining a first frequency hopping pattern and a second frequency hopping pattern satisfies a formula (1); and the formula (1) is: $Y = \text{Perm5}(X, P)$ (1), where Y is an index of a channel in the first frequency hopping pattern or the second frequency hopping pattern; Perm5(X, P) is a permutation function that permutes X based on P; X is an input sequence of the Perm5 function; P is a control word; and when the quantity of channels is 32, X satisfies a formula (2) and P satisfies a formula (3); or when the quantity of channels is 16, X satisfies a formula (4) and P satisfies a formula (5);

the formula (2) is:

$$X=\mathrm{mod}(b(\mathrm{mSFN}_{4:0}\mathrm{XorPCI}_{b:a})+\mathrm{mSFN}_{9:5}, N) \quad (2), \text{where}$$

X is the input sequence of the Perm5 function, mod( ) is a modulo function, b( ) is an initial sequence, $\mathrm{mSFN}_{4:0}$ is to select the fourth bit to the zeroth bit of the time information of the system, $\mathrm{PCI}_{b:a}$ indicates that an $a^{th}$ bit to a $b^{th}$ bit of the PCI are selected, a and b are positive integers, $0 \leq a < b \leq 9$, and $\mathrm{mSFN}_{9:5}$ is to select the ninth bit to the fifth bit of the time information of the system; for example, when mSFN is 96, mSFN is 0001100000 after being converted to binary, so that $\mathrm{mSFN}_{9:5}$ is 00011, and 00011 is corresponding to 3 in decimal;

the formula (3) is:

$$P = \mathrm{mSFN}_{9:5} + 32 * PCI \quad (3), \text{where}$$

P is the control word, $\mathrm{mSFN}_{9:5}$ is to select the ninth bit to the fifth bit of the time information of the system, and PCI is the physical cell identifier;

the formula (4) is:

$$\left\{ \begin{array}{l} X_{3:0} = \mathrm{mod}(b(mSFN_{3:0} XorPCI_{b:a}) + mSFN_{7:4}, N) \\ X_4 = 0 \end{array} \right\}, \quad (4)$$

where $X_{3:0}$ is the third bit to the zeroth bit in the input sequence of the Perm5 function, $X_4$ is the fourth bit in the input sequence of the Perm5 function, mod( ) is a modulo function, b( ) is an initial sequence, $\mathrm{mSFN}_{3:0}$ is to select the third bit to the zeroth bit of the time information of the system, and b(i) indicates that an $i^{th}$ value of the initial sequence b is selected; for example, assuming that b={0, 14, 1, 16, 24, 11, 22, 3, 12, 13, 9, 19, 5, 25, 2, 17, 8, 23, 15, 28, 10, 27, 29, 21, 7, 31, 6, 20, 30, 4, 18, 26}, b(0)=0, b(1)=14, b(2)=1, . . . , b(31)=26; $\mathrm{mSFN}_{7:4}$ is to select the seventh bit to the fourth bit of the time information of the system, N is the quantity of channels, $\mathrm{PCI}_{b:a}$ indicates that an $a^{th}$ bit to a $b^{th}$ bit of the PCI are selected, a and b are positive integers, and $0 \leq a < b \leq 9$; and the formula (5) is:

$$\left\{ \begin{array}{l} P_{\{13,12,11,9,6,5,2,0\}} = (mSFN_{9:4} * 8) XorPCI \\ P_{\{10,8,7,4,3\}} = 0 \end{array} \right\}, \quad (5)$$

where, $P_{\{13,12,11,9,6,5,2,0\}}$ is to select the thirteenth, twelfth, eleventh, ninth, sixth, fifth, second, and zeroth bits of the control word, $P_{\{10,8,7,4,3\}}$ is to select the tenth, eighth, seventh, fourth, and third bits of the control word, $\mathrm{mSFN}_{9:4}$ is to select the ninth bit to the fourth bit of the time information of the system, and PCI is the physical cell identifier.

The transmit end device obtains the frequency hopping pattern through formula calculation, so that a case in which the frequency hopping pattern occupies too much storage space may be avoided, and storage space overheads are reduced.

In a possible design, the sending, based on the first frequency hopping pattern, data in each time unit of a first period by using one of the N channels, and sending, based on the second frequency hopping pattern, data in each time unit of a second period by using one of the N channels includes: performing circular shift on the first frequency hopping pattern and the second frequency hopping pattern based on the PCI; and sending, based on the first frequency hopping pattern obtained after the circular shift, data in each time unit of the first period by using one of the N channels, and sending, based on the second frequency hopping pattern obtained after the circular shift, data in each time unit of the second period by using one of the N channels.

By performing circular shift on the determined frequency hopping pattern based on the PCI, that the transmit end device selects a same frequency hopping pattern may be avoid.

According to a second aspect, an embodiment of this application provides a data transmission method. The method includes:

determining a first frequency hopping pattern and a second frequency hopping pattern, where an index set of channels that is included in the first frequency hopping pattern is the same as an index set included in the second frequency hopping pattern, the index set includes N indexes, the N indexes have a one-to-one correspondence with N channels used for sending data, and the first frequency hopping pattern and the second frequency hopping pattern are different; and receiving, based on the first frequency hopping pattern, data in each time unit of a first period by using one of the N channels, and receiving, based on the second frequency hopping pattern, data in each time unit of a second period by using one of the N channels, where the first period is adjacent to the second period, the first period and the second period each include N time units, the time unit is a time interval between start moments of two adjacent channels, indexes of channels used in any two time units of the first period are different, indexes of channels used in any two time units of the second period are different, and N is a positive integer greater than 0.

In a possible design, the determining a first frequency hopping pattern and a second frequency hopping pattern includes: determining the first frequency hopping pattern and the second frequency hopping pattern based on a permutation function, an input sequence of the permutation function, and a control word, where the input sequence of the permutation function is determined based on time information of a system a PCI, and a quantity of channels, and when the quantity of channels is 16, a bit of the control word that is corresponding to a most significant bit of the input sequence of the permutation function is set to 0.

In a possible design, the determining a first frequency hopping pattern and a second frequency hopping pattern satisfies a formula (1); and the formula (1) is:

$$Y = \mathrm{Perm5}(X, P) \quad (1), \text{where}$$

Y is an index of a channel in the first frequency hopping pattern or the second frequency hopping pattern; Perm5(X, P) is a permutation function that permutes X based on P; X is an input sequence of the Perm5 function; P is a control word; and when the quantity of channels is 32, X satisfies a formula (2) and P satisfies a formula (3); or when the quantity of channels is 16, X satisfies a formula (4) and P satisfies a formula (5);

the formula (2) is:

$$X = \mathrm{mod}(b(\mathrm{mSFN}_{4:0}\mathrm{XorPCI}_{b:a}) + \mathrm{mSFN}_{9:5}, N) \quad (2), \text{where}$$

X is the input sequence of the Perm5 function, mod( ) is a modulo function, b( ) is an initial sequence, $\mathrm{mSFN}_{4:0}$ is to select the fourth bit to the zeroth bit of the time information of the system, $PCI_{b:a}$ indicates that an $a^{th}$ bit to a $b^{th}$ bit of the PCI are selected, a and b are positive integers, $mSFN_{9:5}$ is to select the ninth bit to the fifth bit of the time information of the system, and N is the quantity of channels;

the formula (3) is:

$$P = mSFN_{9:5} + 32 * PCI \qquad (3),$$ where

P is the control word, $mSFN_{9:5}$ is to select the ninth bit to the fifth bit of the time information of the system, and PCI is the physical cell identifier;

the formula (4) is:

$$\begin{cases} X_{3:0} = \mod(b(mSFN_{3:0} XorPCI_{b:a}) + mSFN_{7:4}, N) \\ X_4 = 0 \end{cases} \qquad (4)$$

where $X_{3:0}$ is the third bit to the zeroth bit in the input sequence of the Perm5 function, $X_4$ is the fourth bit in the input sequence of the Perm5 function, mod( ) is a modulo function, b( ) is an initial sequence, $mSFN_{3:0}$ is to select the third bit to the zeroth bit of the time information of the system; $mSFN_{7:4}$ is to select the seventh bit to the fourth bit of the time information of the system, N is the quantity of channels, $PCI_{b:a}$ indicates that an $a^{th}$ bit to a $b^{th}$ bit of the PCI are selected, a and b are positive integers, and $0 \leq a < b \leq 9$; and the formula (5) is:

$$\begin{cases} P_{\{13,12,11,9,6,5,2,0\}} = (mSFN_{9:4} * 8) XorPCI \\ P_{\{10,8,7,4,3\}} = 0 \end{cases}, \qquad (5)$$

where $P_{\{13,12,11,9,6,5,2,0\}}$ is to select the thirteenth, twelfth, eleventh, ninth, sixth, fifth, second, and zeroth bits of the control word, $P_{\{10,8,7,4,3\}}$ is to select the tenth, eighth, seventh, fourth, and third bits of the control word, $mSFN_{9:4}$ is to select the ninth bit to the fourth bit of the time information of the system, and PCI is the physical cell identifier.

In a possible design, the receiving, based on the first frequency hopping pattern, data in each time unit of a first period by using one of the N channels, and receiving, based on the second frequency hopping pattern, data in each time unit of a second period by using one of the N channels includes: performing circular shift on the first frequency hopping pattern and the second frequency hopping pattern based on the PCI; and receiving, based on the first frequency hopping pattern obtained after the circular shift, data in each time unit of the first period by using one of the N channels, and receiving, based on the second frequency hopping pattern obtained after the circular shift, data in each tune unit of the second period by using one of the N channels.

According to a third aspect, an embodiment of this application provides a data transmission apparatus. The apparatus may be a base station, or may be a chip in a base station. The apparatus has a function of implementing the embodiments of the first aspect or the second aspect. The function may be implemented by hardware, or may be implemented by hardware executing corresponding software. The hardware or the software includes one or more modules corresponding to the foregoing function.

In a possible design, when the apparatus is the base station, the base station includes a processing unit and a communications unit. The processing unit may be, for example, a processor, the communications unit may be, for example, a transceiver, and the transceiver includes a radio frequency circuit. Optionally, the base station further includes a storage unit. The storage unit may be, for example, a memory. When the base station includes the storage unit, the storage unit stores a computer-executable instruction. The processing unit is connected to the storage unit. The processing unit executes the computer-executable instruction stored in the storage unit, to enable the base station to perform the data transmission method in any design of the first aspect or the second aspect.

In another possible design, when the apparatus is the chip in a base station, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the data transmission method in any design of the first aspect or the second aspect is performed. Optionally, the storage unit is a storage unit in the chip, for example, a register or a cache; or the storage unit may be a storage unit located outside the chip in the base station, for example, a read-only memory (read-only memory, ROM), another type of static storage device capable of storing static information and instructions, or a random access memory (random access memory, RAM).

The processor mentioned anywhere above may be a general-purpose central processing unit (central processing unit, CPU), a microprocessor, an application-specific integrated circuit (application-specific integrated circuit, ASIC), or one or more integrated circuits for controlling program execution of the data transmission method in the first aspect or the second aspect.

According to a fourth aspect, an embodiment of this application provides a data transmission apparatus. The apparatus may be a terminal device, or may be a chip in a terminal device. The apparatus has a function of implementing the embodiments of the first aspect or the second aspect. The function may be implemented by hardware, or may be implemented by hardware executing corresponding software. The hardware or the software includes one or more modules corresponding to the foregoing function.

In a possible design, when the apparatus is the terminal device, the terminal device includes a processing unit and a communications unit. The processing unit may be, for example, a processor, the communications unit may be, for example, a transceiver, and the transceiver includes a radio frequency circuit. Optionally, the terminal device further includes a storage unit. The storage unit may be, for example, a memory. When the terminal device includes the storage unit, the storage unit stores a computer-executable instruction. The processing unit is connected to the storage unit. The processing unit executes the computer-executable instruction stored in the storage unit, to enable the terminal device to perform the data transmission method in any design of the first aspect or the second aspect.

In another possible design, when the apparatus is the chip in a terminal device, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the data transmission method in any design of the first aspect or the second aspect is performed. Optionally, the storage unit is a storage unit in the chip, for example, a register or a cache; or the storage unit may be a storage unit located outside the chip in the terminal device, for example, a read-only memory, another type of static storage device capable of storing static information and instructions, or a random access memory.

The processor mentioned anywhere above may be a general-purpose central processing unit, a microprocessor, an application-specific integrated circuit, or one or more integrated circuits for controlling program execution of the data transmission method in the first aspect or the second aspect.

According to a fifth aspect, an embodiment of this application further provides a computer-readable storage medium. The computer-readable storage medium stores an instruction, and when the instruction is run on a computer, the computer is enabled to perform the method in each of the foregoing aspects.

According to a sixth aspect, an embodiment of this application further provides a computer program product including an instruction. When the computer program product is run on a computer, the computer is enabled to perform the method in each of the foregoing aspects.

In addition, for technical effects brought by any design in the second aspect to the sixth aspect, refer to technical effects brought by different designs in the first aspect. Details are not described herein again.

These aspects or another aspect in the embodiments of this application are clearer and more comprehensible in descriptions of the following embodiments.

DESCRIPTION OF EMBODIMENTS

The following clearly describes technical solutions in embodiments of this application with reference to the accompanying drawings in the embodiments of this application.

Figure 1:
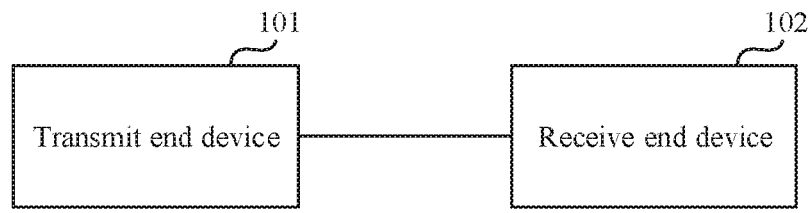
FIG. 1 is a schematic structural diagram of a communications network system according to an embodiment of this application.

The embodiments of this application provide a data transmission method, and the method may be applied to a communications network system. FIG. 1 is a structural diagram of a possible communications network system according to an embodiment of this application. As shown in FIG. 1, the communications network system includes a transmit end device 101 and a receive end device 102. The transmit end device 101 and the receive end device 102 may communicate with each other by using an air interface protocol. The transmit end device 101 may be a base station or a terminal device, and the receive end device 102 may be a base station or a terminal device. When the transmit end device 101 is a base station, the receive end device 102 is a terminal device. When the transmit end device 101 is a terminal device, the receive end device 102 is a base station. Alternatively, the transmit end device 101 and the receive end device 102 may be other devices configured to receive and send data. This embodiment of this application is merely an example, and this is not limited.

The base station mentioned in this specification is a device that enables a terminal to access a wireless network. The base station includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a gNodeB (gNodeB, gNB), a transmission reception point (transmitting and receiving point, TRP), a transmission point (transmitting point, TP), a mobile switching center, and the like. In addition, the base station may further include a Wi-Fi access point (access point, AP) and the like.

The terminal device mentioned in this specification may be a device having a wireless transceiver function, and may be deployed on land, including indoor, outdoor, handheld, wearable, or vehicle-mounted. The terminal device may alternatively be deployed on water (for example, on a ship) or in the air (for example, on an airplane, a balloon, or a satellite). The terminal device may be a mobile phone (mobile phone), an internet of things (IoT) terminal device, a tablet computer (Pad), a computer with a wireless transceiver function, a virtual reality (virtual Reality, VR) terminal device, an augmented reality (augmented Reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. Sometimes, the terminal device may also be referred to as user equipment (user equipment, UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like. The terminal device may further include a relay node. In other words, all devices that can perform data communication with the base station may be used as the terminal device in the embodiments of this application. For ease of description, UE may be used for description.

It should be noted that frequency hopping in the embodiments of this application means that a carrier frequency jumps in a very wide frequency band range based on a specific pattern (sequence). A frequency hopping pattern may also be referred to as a frequency hopping sequence. The frequency hopping pattern may include indexes of channels. The indexes of the channels are sequence indexes rewritten by the transmit end device or the receive end device after the transmit end device or the receive end device determines a preset quantity of available channels and arranges the available channels in ascending or descending order of values of frequencies of the available channels. For example, the transmit end device or the receive end device learns that the available channels include a channel whose center frequency is 2.41 GHz, a channel whose center frequency is 2.45 GHz, and a channel whose center frequency is 2.46 GHz. In this case, an index of the channel whose center frequency is 2.41 GHz may be 1, an index of the channel whose center frequency is 2.45 GHz may be 2, and an index of the channel whose center frequency is 2.46 GHz may be 3. Alternatively, an index of the channel whose center frequency is 2.46 GHz may be 1, an index of the channel whose center frequency is 2.45 GHz may be 2, and an index of the channel whose center frequency is 2.41 GHz may be 3.

Figure 2:
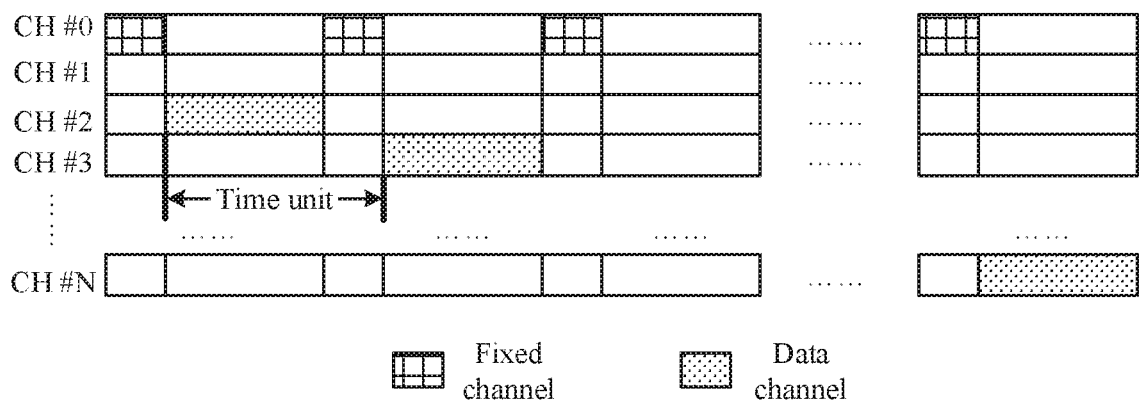
FIG. 2 is a schematic structural diagram of a frequency hopping pattern according to an embodiment of this application.
Figure 3:
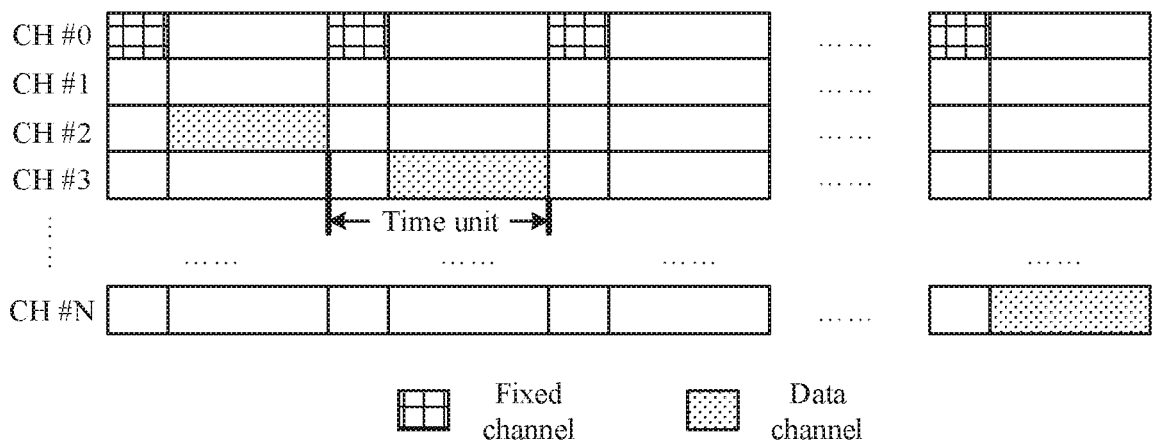
FIG. 3 is a schematic structural diagram of a frequency hopping pattern according to an embodiment of this application.

The channel described in the embodiments of this application is a data channel, and a time unit is a time interval between start moments of two adjacent channels in frequency hopping communication. In other words, the time unit is a time interval between start moments of two adjacent data channels in frequency hopping communication, as shown in FIG. 2. Optionally, the time unit may alternatively be a time interval between stop moments of two adjacent channels in frequency hopping communication, as shown in FIG. 3. For example, in the enhanced machine type communication on unlicensed spectrum (enhanced machine type communication on unlicensed spectrum, eMTC-U), the time unit may be 80 ms. A start moment of the data channel may be the first frame or the first slot of the data channel.

Figure 4:
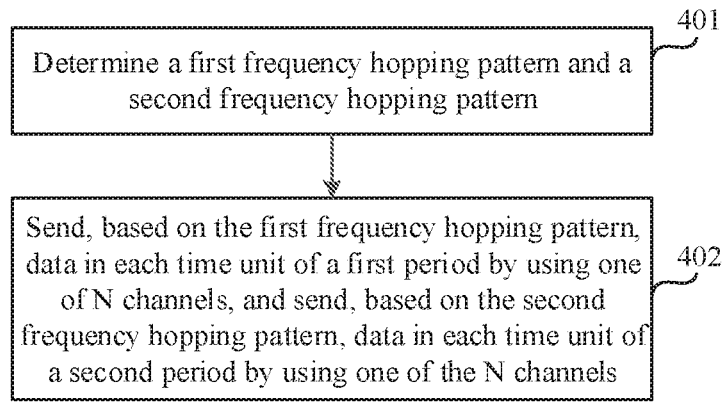
FIG. 4 is a schematic flowchart of a data transmission method according to an embodiment of this application.

Based on the foregoing descriptions, FIG. 4 shows an example of a procedure of a data transmission method according to an embodiment of this application. The procedure may be performed by a transmit end device. For ease of description of the procedure, the following describes the data transmission procedure by using the transmit end device as an execution body.

As shown in FIG. 4, the procedure specifically includes the following steps.

Step 401: Determine a first frequency hopping pattern and a second frequency hopping pattern.

In this embodiment of this application, an index set included in the first frequency hopping pattern is the same as an index set included in the second frequency hopping pattern, and the first frequency hopping pattern is different from the second frequency hopping pattern. In other words, an index arrangement sequence in the index set included in the first frequency hopping pattern is different from an index arrangement sequence in the index set included in the second frequency hopping pattern. Each index set includes N indexes, and the N indexes have a one-to-one correspondence with N channels used for sending data. For example, if a quantity of channels is 16, the index set included in the first frequency hopping pattern is {2, 3, 4, 5, 6, 7, 8, 9, 10, 11, 12, 13, 14, 15, 0, 1}, and the index set included in the second frequency hopping pattern is {5, 6, 7, 8, 9, 10, 11, 12, 13, 14, 15, 0, 1, 2, 3, 4}. A numeral in the index set is an index of a channel.

The frequency hopping pattern may be preset or obtained through formula calculation. For example, some frequency hopping patterns may be preset based on the quantity of channels. When the quantity of channels is 16, 16 different frequency hopping patterns may be preset, and when determining the first frequency hopping pattern and the second frequency hopping pattern, the transmit end device performs pseudo-random selection from the 16 frequency hopping patterns. When the quantity of channels is 32, 32 different frequency hopping patterns may be preset, and when determining the first frequency hopping pattern and the second frequency hopping pattern, the transmit end device performs pseudo-random selection from the 32 frequency hopping patterns. In this way, it can be ensured that a quantity of times of accessing each channel is the same and a time length of accessing each channel is the same, and each channel is accessed and is accessed only once.

Figure 5:
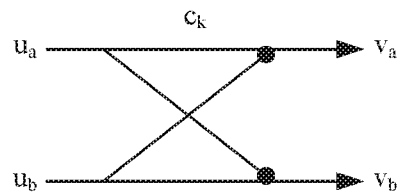
FIG. 5 is a schematic operation diagram of a permutation function according to an embodiment of this application.

Optionally, because several frequency hopping patterns are preset, the transmit end device needs to store these frequency hopping patterns, and this brings storage overheads. To save storage space of the transmit end device, the first frequency hopping pattern and the second frequency hopping pattern may be determined by the transmit end device based on a formula. Optionally, the transmit end device determines the first frequency hopping pattern and the second frequency hopping pattern based on a permutation function, an input sequence of the permutation function, and a control word. The input sequence of the permutation function is determined based on time information of a system, a physical cell identifier (physical cell identifier, PCI), and the quantity of channels. When the permutation function is a 5-bit (bit) permutation function and the quantity of channels is 16, a bit of the control word that is corresponding to a most significant bit of the input sequence of the permutation function is set to 0. The permutation function may be a Perm5 function, the Perm5 function uses a 5-bit sequence $(u_0, u_1, u_2, u_3, u_4)$ as an input, and an output sequence $(v_0, v_1, v_2, v_3, v_4)$ with a length of 5 bits is finally output after an inter-bit permutation operation is performed under control of a control word C. C is a sequence $(c_{13}, c_{12}, \ldots, c_0)$ with a length of 14 bits, and the output sequence $(v_0, v_1, v_2, v_3, v_4)$ ca be converted into a decimal numeral $v=16v_4+8v_3+4v_2+2v_1+v_0$. The Perm5 function includes a series of permutation operations. The permutation operation in each step is controlled by each bit of the control word C. If a value of a bit is 1, it indicates that the permutation operation is performed. If a value of a bit is 0, it indicates that the permutation operation is not performed. Control of each bit may be shown in FIG. 5. When $C_k=0$, $v_a=u_a$, and $v_b=u_b$. When $C_k=1$, $v_a=u_b$, and $v_b=u_a$.

Figure 6:
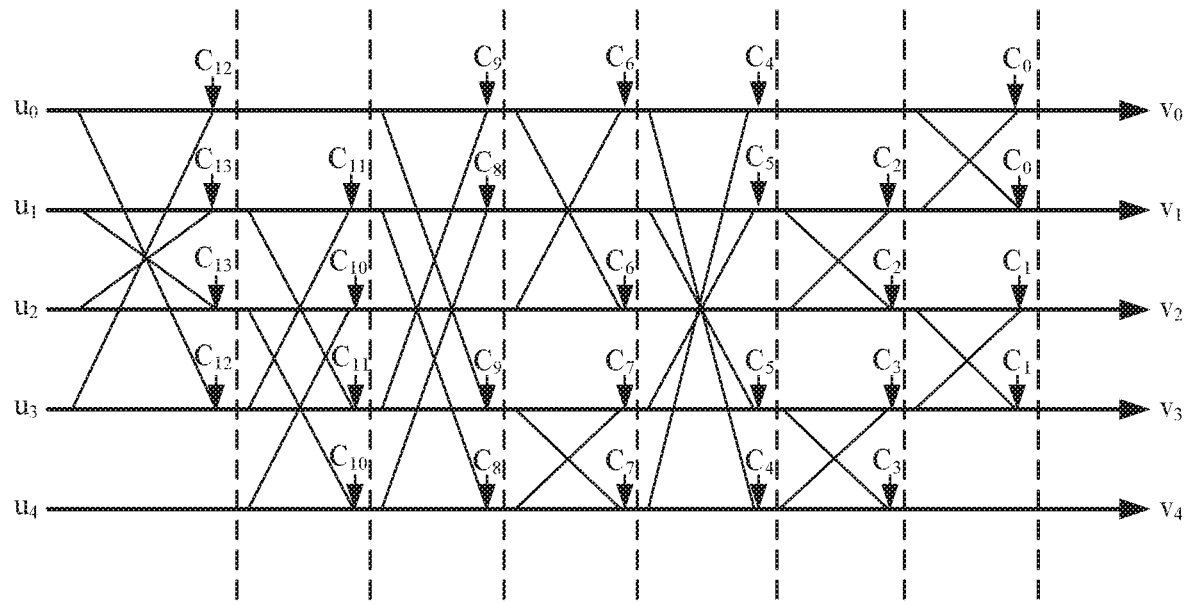
FIG. 6 is a schematic operation diagram of a permutation function according to an embodiment of this application.

As shown in FIG. 6, in an operation of the Perm5 function, $u_0$, $u_1$, $u_2$, $u_3$, and $u_4$ indicate the input sequence of the 5-bit Perm5 function, $u_0$ indicates a least significant bit, namely, the zeroth bit, and $u_4$ indicates a most significant bit, namely, the 4th bit. $C_0$ to $C_{13}$ indicate the 14-bit control word, $C_0$ is a least significant bit, and $C_{13}$ is a most significant bit. $v_0$ to $v_4$ indicate the output sequence of the 5-bit Perm5 function, $v_0$ is a least significant bit, and $v_4$ is a most significant bit. The first step is controlled by $C_{13}$ and $C_{12}$, the second step is controlled by $C_{11}$ and $C_{10}$, and by analogy, the seventh step is controlled by $C_1$ and $C_0$. The output sequence $v=16v_4+8v_3+4v_2+2v_1+v_0$ is corresponding indexes of channels. For example, when the quantity of channels is 32, corresponding indexes of channels are from 0 to 31. When the quantity of channels is 16, only four bits are required for indicating indexes of the channels, correspondingly $u_4$ is 0, and $v_4$ is 0. In this case, $C_{10}$, $C_8$, $C_7$, $C_4$, and $C_3$ of the control word that are corresponding to the most significant bit $u_4$ of the input sequence of the Perm5 function are set to 0.

In other words, when the transmit end device determines the first frequency hopping pattern and the second frequency hopping pattern, the following formula (1) may be met. For example, an initial frequency hopping pattern may be preset, and then another frequency hopping pattern is obtained through mathematical operation by using a Perm (Perm) 5 function. In this way, a requirement for storage space may be reduced, more frequency hopping patterns may be supported, and randomness is increased.

The formula (1) is:

$$Y = \text{Perm5}(X, P) \qquad (1),\text{ where}$$

Y is an index of a channel in the first frequency hopping pattern or the second frequency hopping pattern, Perm5(X, P) is a permutation function that permutes X based on P, and X is an input sequence of the Perm5 function. Optionally, X is a 5-bit input sequence, P is a 14-bit control word, and Y is correspondingly a 5-bit output sequence.

X may be determined based on the time information of the system, the PCI, and the quantity of channels. When the quantity of channels is 32, X may satisfy the following formulas (2), (6), (7), (8), (9), (10), (11), and (12).

The formula (2) is:

$$X = \text{mod}(b(\text{mSFN}_{4:0} \text{XorPCI}_{b:a}) + \text{mSFN}_{9:5}, N) \qquad (2),\text{ where}$$

X is the input sequence of the Perm5 function, mod( ) is a modulo function, b( ) is an initial sequence, the initial sequence may be preset or calculated, the transmit end device may obtain the first frequency hopping pattern and the second frequency hopping pattern based on the initial sequence, $\text{mSFN}_{4:0}$ is to select the least significant five bits (the fourth bit to the zeroth bit) of the time information of the system, and $\text{mSFN}_{9:5}$ is to select the ninth bit to the fifth bit of the time information of the system. For example, when mSFN is 96, mSFN is 0001100000 after being converted to binary, so that $\text{mSFN}_{9:5}$ is 00011, and 00011 is corresponding to 3 in decimal. N is the quantity of channels. $\text{PCI}_{4:0}$ is the least significant five bits of the physical cell identifier.

In this embodiment of this application, mSFN may be a system frame number. In the eMTC-U, a system frame length is 80 ms, and the system performs frequency hopping once every 80 ms. For example, if mSFN=0001001101, $\text{mSFN}_{4:0}$=01101. mod(x, y) is a modulo function. For example, if x=5 and y=2, x/y=2 and a remainder is 1, in other words, mod(x, y)=1. Correspondingly, $\text{mSFN}_{9:5}$ is 00010. $\text{PCI}_{b:a}$ indicates that an $a^{th}$ bit to a $b^{th}$ bit of the PCI are selected, a and b are both positive integers, and $0 \leq a < b \leq 9$. For example, if PCI=000101101, b=4, and a=0, $\text{PCI}_{b:a} = \text{PCI}_{4:0}$=01101. Xor is an exclusive OR operator. For example, if x=100 and y=101, xXory=001.

In a possible implementation, X may also satisfy the formula (6).

The formula (6) is:

$$X = \text{mod}(b(\text{mSFN}_{4:0} \text{XorPCI}_{b:a}) + (\text{mSFN}_{4:0} \text{XorPCI}_{d:c}), N) \qquad (6).$$

The formula (7) is:

$$X = b(\text{mSFN}_{4:0} \text{XorPCI}_{b:a}) \text{XormSFN}_{9:5} \qquad (7).$$

The formula (8) is:

$$X = b(\text{mSFN}_{4:0} \text{XorPCI}_{b:a}) \text{XormSFN}_{9:5} \text{XorPCI}_{d:c} \qquad (8).$$

The formula (9) is:

$$X = \text{mod}(b(I) + \text{mSFN}_{9:5}, N) \qquad (9).$$

The formula (10) is:

$$X = \text{mod}(b(I) + (\text{mSFN}_{9:5} \text{XormSFN}_{9:5}), N) \qquad (10).$$

Optionally, X may alternatively satisfy the formula (11) or (12).

The formula (11) is:

$$X = \text{circshift}(\text{mod}(b(I) + \text{mSFN}_{9:5}, N), \text{mSFN}_{9:5}) \qquad (11).$$

The formula (12) is:

$$X = \text{circshift}(\text{mod}(b(I) + (\text{mSFN}_{9:5} \text{XorPCI}_{d:c}), N), \text{mSFN}_{9:5}) \qquad (12).$$

a, b, c, and d are positive integers, $0 \leq a < b \leq 9$, and $0 \leq c < d \leq 9$. I is an input parameter determined by mSFN and/or the PCI, for example, $I = (\text{mSFN}_{4:0} + \text{PCI}_{b:a}) \text{mod } N$. circshift(x, y) is a circular shift function, in other words, an input x is shifted to the right by y bits. For example, if x=0011010 and y=2, circshift(x, y)=1000110.

When the quantity of channels is 32, P may satisfy the following formula (3) or (13).

The formula (3) is:

$$P = \text{mSFN}_{9:5} + 32 * PCI \qquad (3).$$

The formula (13) is:

$$P = b(\text{mSFN}_{9:5}) + 32 * PCI \qquad (13).$$

P is the control word, b( ) is an initial sequence, $\text{mSFN}_{9:5}$ is to select the ninth bit to the fifth bit of the time information of the system, N is the quantity of channels, and PCI is the physical cell identifier.

To clearly explain the foregoing procedure of determining X and P, the following uses formulas (2) and (3) as an example for description.

For example, when the quantity of channels is 32, it is assumed that PCI=0, $\text{mSFN}_{4:0}$={0, 1, 2, . . . , 31}, and b={0, 14, 1, 16, 24, 11, 22, 3, 12, 13, 9, 19, 5, 25, 2, 17, 8, 23, 15, 28, 10, 27, 29, 21, 7, 31, 6, 20, 30, 4, 18, 26}.

The following frequency hopping pattern may be obtained: Pattern(0)={f(0), f(1), . . . , f(31)}={b(0), b(1), b(2), b(3), . . . , b(26), b(27), b(28), b(29), b(30), b(31)}={0, 14, 1, 16, 24, 11, 22, 3, 12, 13, 9, 19, 5, 25, 2, 17, 8, 23, 15, 28, 10, 27, 29, 21, 7, 31, 6, 20, 30, 4, 18, 26}.

Pattern(0) is a frequency hopping pattern, and may be abbreviated as Pa(0), and f(0), f(1), . . . , and f(31) are indexes of channels in the frequency hopping pattern. A frequency hopping pattern corresponding to Pattern(0) may be shown in FIG. 7.

When PCI=5, $\text{mSFN}_{4:0}$={0, 1, 2, . . . , 31}, and b={0, 14, 1, 16, 24, 11, 2, 3, 12, 13, 9, 19, 5, 25, 2, 17, 8, 23, 15, 28, 10, 27, 29, 21, 7, 31, 6, 20, 30, 4, 18, 26}, the following frequency hopping pattern may be obtained:

Pattern(0)={f(0), f(1), . . . , f(31)}={b(5), b(6), b(7), b(8), . . . , b(31), b(0), b(1), b(2), b(3), b(4)}={25, 18, 9, 14, 28, 0, 2, 1, 19, 5, 3, 8, 21, 20, 11, 17, 27, 24, 7, 23, 15, 16, 22, 29, 4, 30, 26, 10, 31, 13, 6, 12}. A frequency hopping pattern corresponding to Pattern(0) may be shown in FIG. 8.

Figure 7:
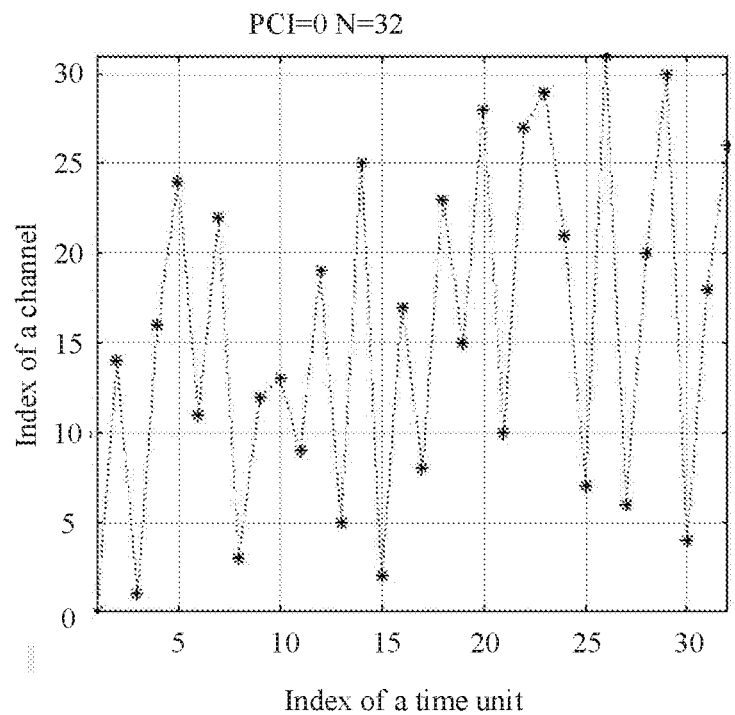
FIG. 7 is a schematic structural diagram of a frequency hopping pattern according to an embodiment of this application.
Figure 8:
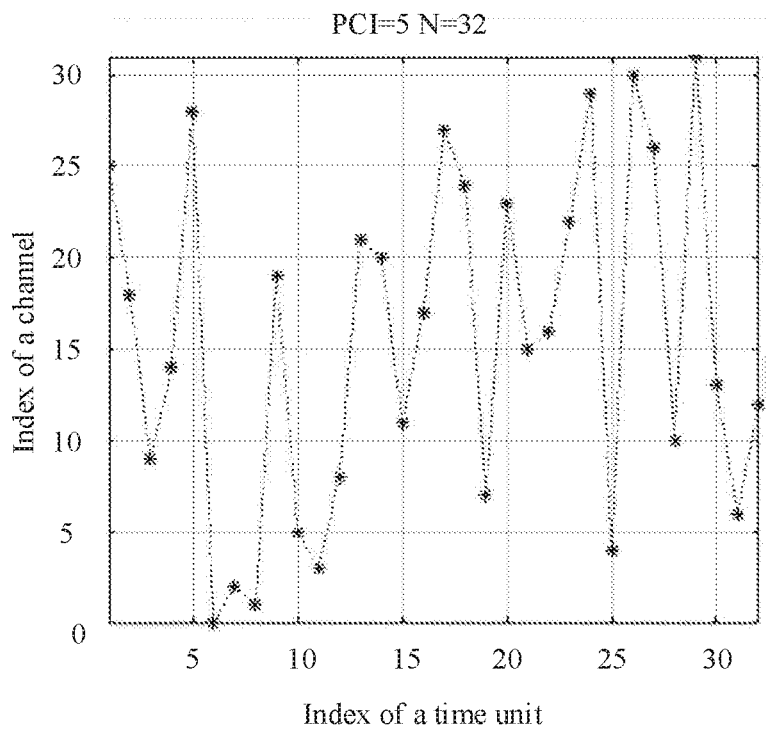
FIG. 8 is a schematic structural diagram of a frequency hopping pattern according to an embodiment of this application.

It can be learned from FIG. 7 and FIG. 8 that a problem of frequency hopping collision between adjacent cells may be effectively avoided by using circular shift generated by the PCI.

When the quantity of channels is 16, X may satisfy the following formulas (4), (14), (15), (16), (17), (18), (19), and (20).

The formula (4) is:

$$\begin{cases} X_{3:0} = \mathrm{mod}(b(mSFN_{3:0}XorPCI_{b:a}) + mSFN_{7:4}, N) \\ X_4 = 0 \end{cases} \quad (4)$$

where $X_{3:0}$ is the third bit to the zeroth bit in the input sequence of the Perm5 function, $X_4$ is the fourth bit in the input sequence of the Perm5 function, $b(\ )$ is an initial sequence, $mSFN_{3:0}$ is to select the third bit to the zeroth bit of the time information of the system, $mSFN_{7:4}$ is to select the seventh bit to the fourth bit of the time information of the system, N is the quantity of channels, and $PCI_{3:0}$ is to select the third bit to the zeroth bit of the physical cell identifier.

The formula (14) is:

$$\begin{cases} X_{3:0} = \mathrm{mod}(b(mSFN_{3:0}XorPCI_{b:a}) + (mSFN_{7:4}XorPCI_{d:c}), N) \\ X_4 = 0 \end{cases} \quad (14)$$

The formula (15) is:

$$\begin{cases} X_{3:0} = b(mSFN_{3:0}XorPCI_{b:a})XormSFN_{7:4} \\ X_4 = 0 \end{cases} \quad (15)$$

The formula (16) is:

$$\begin{cases} X_{3:0} = b(mSFN_{3:0}XorPCI_{b:a})XormSFN_{7:4}XorPCI_{d:c} \\ X_4 = 0 \end{cases} \quad (16)$$

The formula (17) is:

$$\begin{cases} X_{3:0} = \mathrm{mod}(b(I) + mSFN_{7:4}, N) \\ X_4 = 0 \end{cases} \quad (17)$$

The formula (18) is:

$$\begin{cases} X_{3:0} = \mathrm{mod}(b(I) + (mSFN_{7:4}XorPCI_{d:c}), N) \\ X_4 = 0 \end{cases} \quad (18)$$

The formula (19) is:

$$\begin{cases} X_{3:0} = circshift(\mathrm{mod}(b(I) + mSFN_{7:4}, N), mSFN_{7:4}) \\ X_4 = 0 \end{cases} \quad (19)$$

The formula (20) is:

$$\begin{cases} X_{3:0} = circshift(\mathrm{mod}(b(I) + (PCI_{d:c}XormSFN_{7:4}), N), mSFN_{7:4}) \\ X_4 = 0 \end{cases} \quad (20)$$

a, b, c, and d are positive integers, $0 \le a < b \le 9$, and $0 \le c < d \le 9$. I is an input parameter determined by mSFN and/or the PCI, and $I = \mathrm{mod}(mSFN_{3:0} + PCI_{b:a}, N)$. If $mSFN = 0001001101$, $mSFN_{7:4} = 0100$. $\mathrm{mod}(x, y)$ is a modulo function. For example, if x=5 and y=2, x/y=2 and a remainder is 1, in other words, $\mathrm{mod}(x, y)=1$. Correspondingly, $mSFN_{3:0}$ is 1101, and $mSFN_{7:4}$ is 0100. $PCI_{b:a}$ indicates that an $a^{th}$ bit to a $b^{th}$ bit of the PCI are selected. For example, if PCI=000101101, b=3, and a=0, $PCI_{b:a}=PCI_{3:0}=1101$. circshift(x, y) is a circular shift function, in other words, an input x is shifted to the right by y bits. For example, if x=011010 and y=2, circshift(x, y)=1000110.

When the quantity of channels is 16, P uses 9 of all the 14 bits. P may satisfy formulas (5), (21), and (22).

The formula (5) is:

$$\begin{cases} P_{\{13,12,11,9,6,5,2,0\}} = (mSFN_{9:4} * 8)XorPCI \\ P_{\{10,8,7,4,3\}} = 0 \end{cases} \quad (5)$$

The formula (13) is:

$$\begin{cases} P_{\{13,12,11,9,6,5,2,0\}} = \mathrm{mod}(mSFN_{9:4} + PCI, 512) \\ P_{\{10,8,7,4,3\}} = 0 \end{cases} \quad (13)$$

The formula (14) is:

$$\begin{cases} P_{\{13,12,11,9,6,5,2,0\}} = \mathrm{mod}(b(mSFN_{7:4}) + 16*mSFN_{9:8} + PCI, 2^9) \\ P_{\{10,8,7,4,3\}} = 0 \end{cases} \quad (14)$$

$P_{\{13,12,11,9,6,5,2,0\}}$ is the thirteenth, twelfth, eleventh, ninth, sixth, fifth, second, and zeroth bits of the control word, $P_{\{10,8,7,4,3\}}$ is the tenth, eighth, seventh, fourth, and third bits of the control word, $b(\ )$ is an initial sequence, $mSFN_{7:4}$ is the seventh bit to the fourth bit of the time information of the system, $mSFN_{9:4}$ is to select the ninth bit to the fourth bit of the time information of the system, $mSFN_{9:8}$ is to select the ninth bit to the eighth bit of the time information of the system, and the PCI is the physical cell identifier.

It should be noted that the foregoing formulas are merely examples, and another formula used to determine X and P is also applicable to this application.

The transmit end device may determine the first frequency hopping pattern and the second frequency hopping pattern by using the foregoing formulas.

Step 402: Send, based on the first frequency hopping pattern, data in each time unit of a first period by using one of the N channels, and send, based on the second frequency hopping pattern, data in each time unit of a second period by using one of the N channels.

Figure 9:
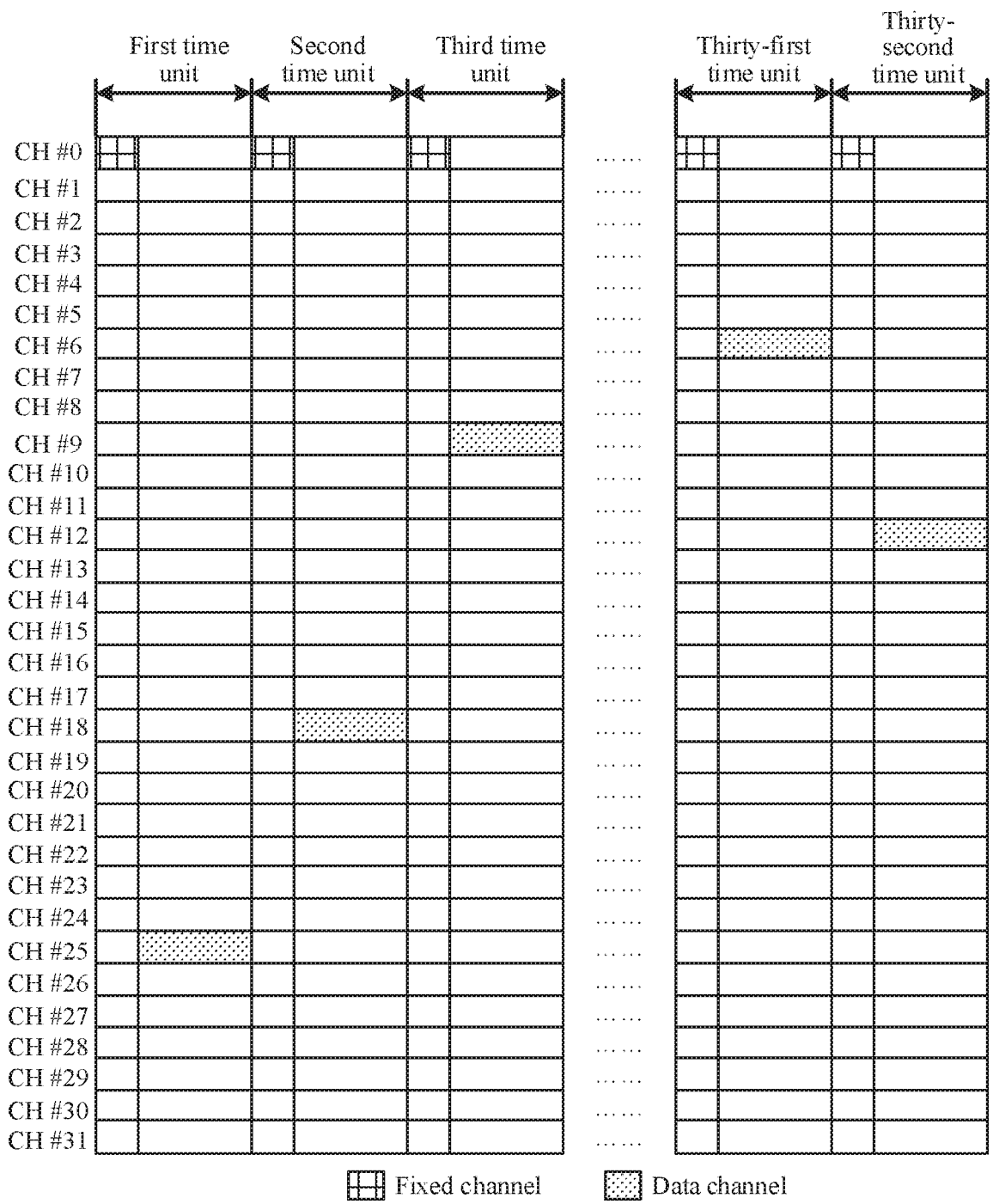
FIG. 9 is a schematic structural diagram of a frequency hopping pattern according to an embodiment of this application.

After obtaining the first frequency hopping pattern and the second frequency hopping pattern, the transmit end device may send, based on the first frequency hopping pattern, data in each time unit of the first period by using one of the N channels, and send, based on the second frequency hopping pattern, data in each time unit of the second period by using one of the N channels. The first period and the second period each include N time units, in other words, the first period or the second period is a product of a time unit and a quantity of channels, and N is a positive integer greater than 0. For example, if the time unit is 80 ms and the quantity of channels is 32, the first period or the second period is 80*32 ms. The first period is adjacent to the second period, indexes of channels used in any two time units of the first period are different, and indexes of channels used in any two time units of the second period are also different. In other words, when the quantity of channels is 32, indexes of the 32 channels used in the first period are different from each other, and indexes of the 32 channels used in the second period are different from each other. When sending data, the transmit end device sequentially uses, based on an arrangement sequence of the indexes of the channels in the frequency hopping pattern, the channels corresponding to the indexes of the channels to send the data. For example, 32 channels are used as an example, and the frequency hopping pattern determined in step 401 is {25, 18, 9, 14, 28, 0, 2, 1, 19, 5, 3, 8, 21, 20, 11, 17, 27, 24, 7, 23, 15, 16, 22, 29, 4, 30, 26, 10, 31, 13, 6, 12}. As shown in FIG. 9, the transmit end device selects a channel whose index is 25 to send data in a first time unit, selects a channel whose index is 18 to send data in a second time unit, selects a channel whose index is 9 to send data in a third time unit, and selects a corresponding channel based on the arrangement sequence of the indexes of the channels in the frequency hopping pattern. In this way, it can be ensured that each channel is accessed once and is accessed only once in one period.

Figure 10:
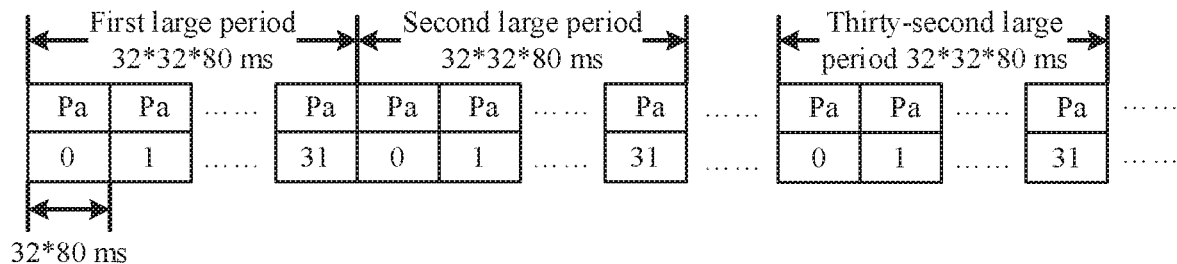
FIG. 10 is a schematic structural diagram of a frequency hopping pattern according to an embodiment of this application.

It should be noted that the first period and the second period each are a small period, and are a product of a time unit and a quantity of channels. For example, 32 channels are used as an example, and duration of the small period is 80*32 ms, in other words, duration of a frequency hopping pattern is 80*32 ms. A sum of duration of 32 frequency hopping patterns is a large period. As shown in FIG. 10, any two frequency hopping patterns in the large period are different. After a current large period ends, another large period starts, and the 32 frequency hopping patterns start to be repeated. Pa is an abbreviation of the frequency hopping pattern Pattern.

Figure 11:
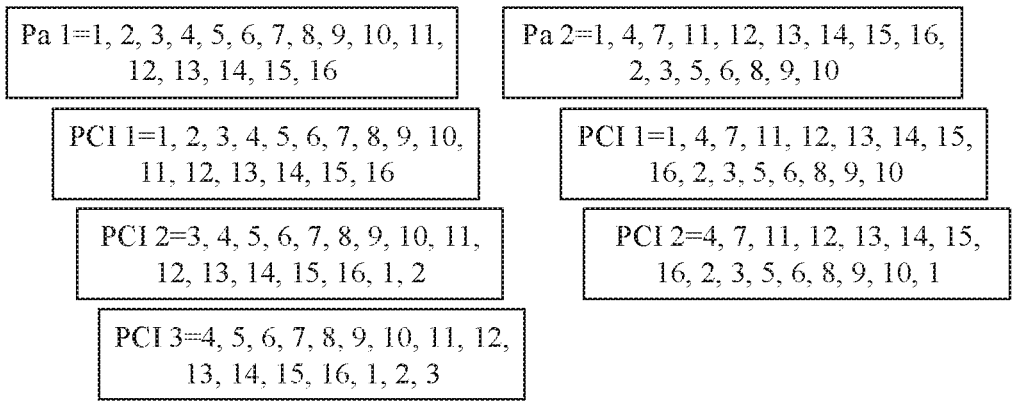
FIG. 11 is a schematic diagram of circular shift according to an embodiment of this application.

Optionally, after the first frequency hopping pattern and the second frequency hopping pattern are determined, to prevent the transmit end device from selecting a same frequency hopping pattern, circular shift may further be performed based on the PCI, to obtain the first frequency hopping pattern after the circular shift and the second frequency hopping pattern after the circular shift, such as frequency hopping patterns Pa 1 and Pa 2 in FIG. 11. A shift value may be PCI % N, and N is the quantity of channels.

Figure 12:
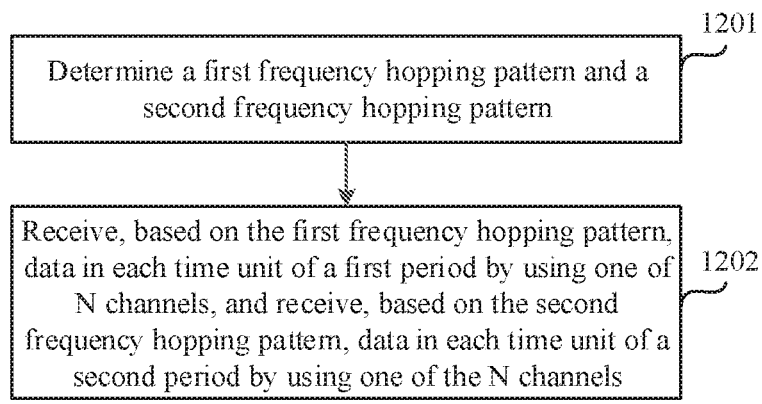
FIG. 12 is a schematic flowchart of a data transmission method according to an embodiment of this application.

Based on a same technical concept, FIG. 12 shows an example of a data transmission procedure according to an embodiment of this application. The procedure may be performed by a receive end device.

As shown in FIG. 12, the procedure specifically includes the following steps.

Step 1201: Determine a first frequency hopping pattern and a second frequency hopping pattern.

Step 1202: Receive, based on the first frequency hopping pattern, data in each time unit of a first period by using one of N channels, and receive, based on the second frequency hopping pattern, data in each time unit of a second period by using one of the N channels.

It should be noted that a procedure in which the receive end device determines the first frequency hopping pattern and the second frequency hopping pattern, receives, based on the first frequency hopping pattern, the data in each time unit of the first period by using one of the N channels, and receives, based on the second frequency hopping pattern, the data in each time unit of the second period by using one of the N channels is similar to a procedure in which the transmit end device determines the first frequency hopping pattern and the second frequency hopping pattern when sending data. Specific procedure steps are already described in the foregoing embodiment, and details are not described herein.

Figure 13:
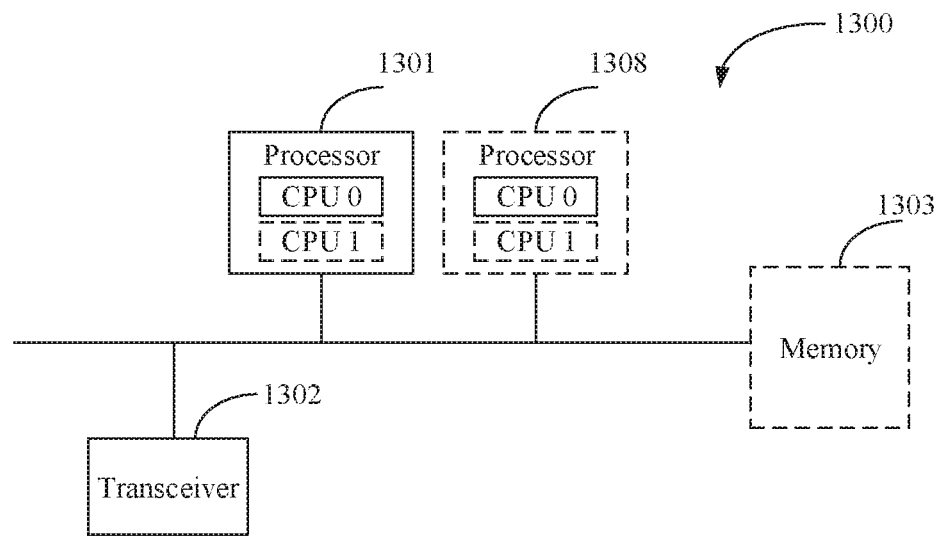
FIG. 13 is a schematic structural diagram of a data transmission apparatus according to an embodiment of this application.

Based on a same inventive concept, FIG. 13 is a schematic diagram of an apparatus according to an embodiment of this application. The apparatus may be a transmit end device, and may perform the method performed by the transmit end device in any of the foregoing embodiments.

The transmit end device 1300 includes at least one processor 1301 and a transceiver 1302, and optionally further includes a memory 1303. The processor 1301, the transceiver 1302, and the memory 1303 are connected to each other.

The processor 1301 may be a general-purpose central processing unit (CPU), a microprocessor, an application-specific integrated circuit (application-specific integrated circuit, ASIC), or one or more integrated circuits for controlling program execution in this embodiment of this application.

The transceiver 1302 is configured to communicate with another device or a communications network. The transceiver includes a radio frequency circuit.

The memory 1303 may be a read-only memory (read-only memory, ROM) or another type of static storage device that can store static information and an instruction, a random access memory (random access memory, RAM) or another type of dynamic storage device that can store information and an instruction, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory 1303 may exist independently, and is connected to the processor 1301. The memory 1303 may alternatively be integrated with the processor. The memory 1303 is configured to store application program code for performing the embodiments of this application, and the execution is controlled by the processor 1301. The processor 1301 is configured to execute the application program code stored in the memory 1303.

During specific implementation, in an embodiment, the processor 1301 may include one or more CPUs, for example, a CPU 0 and a CPU 1 in FIG. 13.

During specific implementation, in an embodiment, the transmit end device 1300 may include a plurality of processors, for example, the processor 1301 and a processor 1308 in FIG. 13. Each of the processors may be a single-core (single-CPU) processor, or may be a multi-core (multi-CPU) processor. Herein, the processor may be one or more devices, circuits, and/or processing cores for processing data (for example, a computer program instruction).

It should be understood that the transmit end device may be configured to implement the steps performed by the transmit end device in the data transmission methods in the embodiments of this application. For related features, refer to the foregoing descriptions. Details are not described herein again.

Figure 14:
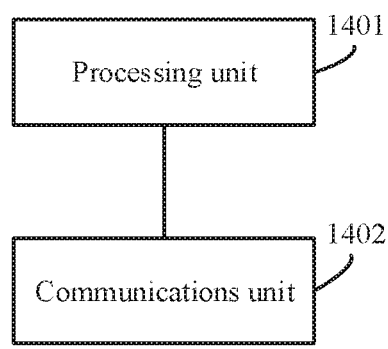
FIG. 14 is a schematic structural diagram of a data transmission apparatus according to an embodiment of this application.

In this application, function modules in the transmit end device may be obtained through division based on the foregoing method examples. For example, each function module corresponding to each function may be obtained through division, or two or more functions may be integrated into one processing module. The integrated module may be implemented in a form of hardware, or may be implemented in a form of a software functional module. It should be noted that, in this application, module division is an example, and is merely logical function division. During actual implementation, another division manner may be used. For example, when each functional module corresponding to each function is obtained through division, FIG. 14 is a schematic diagram of an apparatus. The apparatus may be the transmit end device in the foregoing embodiments, and the apparatus includes a processing unit 1401 and a communications unit 1402.

The processing unit 1401 is configured to determine a first frequency hopping pattern and a second frequency hopping pattern, where an index set included in the first frequency hopping pattern is the same as an index set included in the second frequency hopping pattern, the index set includes N indexes, the N indexes have a one-to-one correspondence with N channels used for sending data, and the first frequency hopping pattern and the second frequency hopping pattern are different.

The communications unit 1402 is configured to: send, based on the first frequency hopping pattern determined by the processing unit 1401, data in each time unit of a first period by using one of the N channels, and send, based on the second frequency hopping pattern determined by the processing unit 1401, data in each time unit of a second period by using one of the N channels, where the first period is adjacent to the second period, the first period and the second period each include N time units, the time unit is a time interval between start moments of two adjacent channels, indexes of channels used in any two time units of the first period are different, indexes of channels used in any two time units of the second period are different, and N is a positive integer greater than 0.

Optionally, when determining the first frequency hopping pattern and the second frequency hopping pattern, the processing unit 1401 is specifically configured to:

determine the first frequency hopping pattern and the second frequency hopping pattern based on a permutation function, an input sequence of the permutation function, and a control word, where the input sequence of the permutation function is determined based on time information of a system, a PCI, and a quantity of channels, and when the quantity of channels is 16, a bit of the control word that is corresponding to a most significant bit of the input sequence of the permutation function is set to 0.

Optionally, the processing unit 1401 is specifically configured to:

determine the first frequency hopping pattern and the second frequency hopping pattern satisfy a formula (1); and
the formula (1) is:

$$Y = \text{Perm5}(X, P) \qquad (1),\text{ where}$$

Y is an index of a channel in the first frequency hopping pattern or the second frequency hopping pattern; Perm5(X, P) is a permutation function that permutes X based on P; X is an input sequence of the Perm5 function; P is a control word; and when the quantity of channels is 32, X satisfies a formula (2) and P satisfies a formula (3); or when the quantity of channels is 16, X satisfies a formula (4) and P satisfies a formula (5);

the formula (2) is:

$$X = \text{mod}(b(mSFN_{4:0} \text{XorPCI}_{b:a}) + mSFN_{9:5}, N) \qquad (2),\text{ where}$$

X is the input sequence of the Perm5 function, mod( ) is a modulo function, b( ) is an initial sequence, $mSFN_{4:0}$ is to select the fourth bit to the zeroth bit of the time information of the system, $PCI_{b:a}$ indicates that an $a^{th}$ bit to a $b^{th}$ bit of the PCI are selected, a and b are positive integers, $0 \le a < b \le 9$, $mSFN_{9:5}$ is to select the ninth bit to the fifth bit of the time information of the system, and N is the quantity of channels;

the formula (3) is:

$$P = mSFN_{9:5} + 32 * PCI \qquad (3),\text{ where}$$

P is the control word, $mSFN_{9:5}$ is to select the ninth bit to the fifth bit of the time information of the system, and PCI is the physical cell identifier;

the formula (4) is:

$$\begin{cases} X_{3:0} = \text{mod}(b(mSFN_{3:0} \text{XorPCI}_{b:a}) + mSFN_{7:4}, N) \\ X_4 = 0 \end{cases}, \qquad (4)$$

where $X_{3:0}$ is the third bit to the zeroth bit in the input sequence of the Perm5 function, $X_4$ is the fourth bit in the input sequence of the Perm5 function, mod( ) is a modulo function, b( ) is an initial sequence, $mSFN_{3:0}$ is to select the third bit to the zeroth bit of the time information of the system, $mSFN_{7:4}$ is to select the seventh bit to the fourth bit of the time information of the system, N is the quantity of channels, $PCI_{b:a}$ indicates that an $a^{th}$ bit to a $b^{th}$ bit of the PCI are selected, a and b are positive integers, and $0 \le a < b \le 9$; and the formula (5) is:

$$\begin{cases} P_{\{13,12,11,9,6,5,2,0\}} = (mSFN_{9:4} * 8) \text{XorPCI} \\ P_{\{10,8,7,4,3\}} = 0 \end{cases}, \qquad (5)$$

where $P_{\{13,12,11,9,6,5,2,0\}}$ is to select the thirteenth, twelfth, eleventh, ninth, sixth, fifth, second, and zeroth bits of the control word, $P_{\{10,8,7,4,3\}}$ is to select the tenth, eighth, seventh, fourth, and third bits of the control word, $mSFN_{9:4}$ is to select the ninth bit to the fourth bit of the time information of the system, and PCI is the physical cell identifier.

Optionally, when sending, based on the first frequency hopping pattern, data in each time unit of the first period by using one of the N channels, and sending, based on the second frequency hopping pattern, data in each time unit of the second period by using one of the N channels, the processing unit 1401 is specifically configured to:

perform circular shift on the first frequency hopping pattern and the second frequency hopping pattern based on the PCI; and control the communications unit 1402 to: send, based on the first frequency hopping pattern obtained after the circular shift, data in each time unit of the first period by using one of the N channels, and send, based on the second frequency hopping pattern obtained after the circular shift, data in each time unit of the second period by using one of the N channels.

Figure 15:
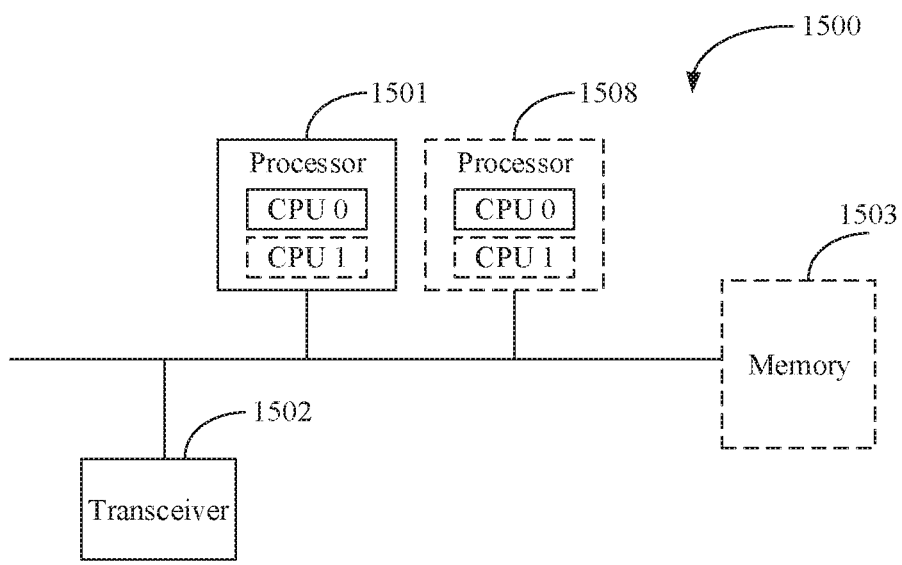
FIG. 15 is a schematic structural diagram of a data transmission apparatus according to an embodiment of this application.

Based on a same inventive concept, FIG. 15 is a schematic diagram of an apparatus according to this application. The apparatus may be a receive end device, and may perform the method performed by the receive end device in any one of the foregoing embodiments.

The receive end device 1500 includes at least one processor 1501 and a transceiver 1502, and optionally further includes a memory 1503. The processor 1501, the transceiver 1502, and the memory 1503 are connected to each other.

The processor 1501 may be a general purpose central processing unit, a microprocessor, an application-specific integrated circuit, or one or more integrated circuits for controlling program execution in this embodiment of this application.

The transceiver 1502 is configured to communicate with another device or a communications network. The transceiver includes a radio frequency circuit.

The memory 1503 may be a read-only memory or another type of static storage device that can store static information and an instruction, a random access memory or another type of dynamic storage device that can store information and an instruction, or may be an electrically erasable programmable read-only memory, a compact disc read-only memory or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or data structure and that can be accessed by a computer. However, this is not limited thereto. The memory 1503 may exist independently, and is connected to the processor 1501. The memory 1503 may alternatively be integrated with the processor. The memory 1503 is configured to store application program code for performing the embodiments of this application, and the execution is controlled by the processor 1501. The processor 1501 is configured to execute the application program code stored in the memory 1503.

During specific implementation, in an embodiment, the processor 1501 may include one or more CPUs, for example, a CPU 0 and a CPU 1 in FIG. 15.

During specific implementation, in an embodiment, the receive end device 1500 may include a plurality of processors, for example, the processor 1501 and a processor 1508 in FIG. 15. Each of the processors may be a single-core (single-CPU) processor, or may be a multi-core (multi-CPU) processor. Herein, the processor may be one or more devices, circuits, and/or processing cores for processing data (for example, a computer program instruction).

It should be understood that the receive end device may be configured to implement the steps performed by the receive end device in the data transmission methods in the embodiments of this application. For related features, refer to the foregoing descriptions. Details are not described herein again.

Figure 16:
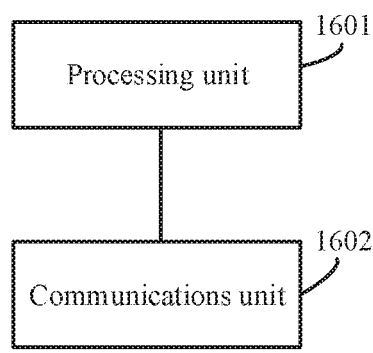
FIG. 16 is a schematic structural diagram of a data transmission apparatus according to an embodiment of this application.

In this application, function modules in the receive end device may be obtained through division based on the foregoing method examples. For example, each function module corresponding to each function may be obtained through division, or two or more functions may be integrated into one processing module. The integrated module may be implemented in a form of hardware, or may be implemented in a form of a software functional module. It should be noted that, in this application, module division is an example, and is merely logical function division. During actual implementation, another division manner may be used. For example, when each functional module corresponding to each function is obtained through division, FIG. 16 is a schematic diagram of an apparatus. The apparatus may be the receive end device in the foregoing embodiments, and the apparatus includes a processing unit 1601 and a communications unit 1602.

The processing unit 1601 is configured to determine a first frequency hopping pattern and a second frequency hopping pattern, where an index set included in the first frequency hopping pattern is the same as an index set included in the second frequency hopping pattern, the index set includes N indexes, the N indexes have a one-to-one correspondence with N channels used for sending data, and the first frequency hopping pattern and the second frequency hopping pattern are different.

The communications unit 1602 is configured to: receive, based on the first frequency hopping pattern determined by the processing unit 1601, data in each time unit of a first period by using one of the N channels, and receive, based on the second frequency hopping pattern determined by the processing unit 1601, data in each time unit of a second period by using one of the N channels, where the first period is adjacent to the second period, the first period and the second period each include N time units, the time unit is a time interval between start moments of two adjacent channels, indexes of channels used in any two time units of the first period are different, indexes of channels used in any two time units of the second period are different, and N is a positive integer greater than 0.

Optionally, when determining the first frequency hopping pattern and the second frequency hopping pattern, the processing unit 1601 is specifically configured to:

determine the first frequency hopping pattern and the second frequency hopping pattern based on a permutation function, an input sequence of the permutation function, and a control word, where the input sequence of the permutation function is determined based on time information of a system, a PCI, and a quantity of channels, and when the quantity of channels is 16, a bit of the control word that is corresponding to a most significant bit of the input sequence of the permutation function is set to 0.

Optionally, the processing unit 1601 is specifically configured to:

determine the first frequency hopping pattern and the second frequency hopping pattern satisfy a formula (1); and the formula (1) is:

$$Y = \mathrm{Perm5}(X, P) \qquad (1), \text{where}$$

Y is an index of a channel in the first frequency hopping pattern or the second frequency hopping pattern; Perm5(X, P) is a permutation function that permutes X based on P; X is an input sequence of the Perm5 function; P is a control word; and when the quantity of channels is 32, X satisfies a formula (2) and P satisfies a formula (3); or when the quantity of channels is 16, X satisfies a formula (4) and P satisfies a formula (5);

the formula (2) is:

$$X = \mathrm{mod}(b(\mathrm{mSFN}_{4:0} \,\mathrm{Xor}\, \mathrm{PCI}_{b:a}) + \mathrm{mSFN}_{9:5}, N) \qquad (2), \text{where}$$

X is the input sequence of the Perm5 function, mod( ) is a modulo function, b( ) is an initial sequence, $\mathrm{mSFN}_{4:0}$ is to select the fourth bit to the zeroth bit of the time information of the system, $\mathrm{PCI}_{b:a}$ indicates that an $a^{th}$ bit to a $b^{th}$ bit of the PCI are selected, a and b are positive integers, $0 \le a < b \le 9$, $\mathrm{mSFN}_{9:5}$ is to select the ninth bit to the fifth bit of the time information of the system, and N is the quantity of channels; the formula (3) is:

$$P = \mathrm{mSFN}_{9:5} + 32 * PCI \qquad (3), \text{where}$$

P is the control word, $\mathrm{mSFN}_{9:5}$ is to select the ninth bit to the fifth bit of the time information of the system, and PCI is the physical cell identifier; the formula (4) is:

$$\begin{cases} X_{3:0} = \mathrm{mod}(b(mSFN_{3:0}\, XorPCI_{b:a}) + mSFN_{7:4},\, N) \\ X_4 = 0 \end{cases}, \quad (4)$$

where $X_{3:0}$ is the third bit to the zeroth bit in the input sequence of the Perm5 function, $X_4$ is the fourth bit in the input sequence of the Perm5 function, mod( ) is a modulo function, b( ) is an initial sequence, $mSFN_{3:0}$ is to select the third bit to the zeroth bit of the time information of the system, $mSFN_{7:4}$ is to select the seventh bit to the fourth bit of the time information of the system, N is the quantity of channels, $PCI_{b:a}$ indicates that an $a^{th}$ bit to a $b^{th}$ bit of the PCI are selected, a and b are positive integers, and $0 \le a < b \le 9$; and the formula (5) is:

$$\begin{cases} P_{\{13,12,11,9,6,5,2,0\}} = (mSFN_{9:4} * 8) XorPCI \\ P_{\{10,8,7,4,3\}} = 0 \end{cases}, \quad (5)$$

where $P_{\{13,12,11,9,6,5,2,0\}}$ is to select the thirteenth, twelfth, eleventh, ninth, sixth, fifth, second, and zeroth bits of the control word, $P_{\{10,8,7,4,3\}}$ is to select the tenth, eighth, seventh, fourth, and third bits of the control word, $mSFN_{9:4}$ is to select the ninth bit to the fourth bit of the time information of the system, and PCI is the physical cell identifier.

Optionally, when receiving, based on the first frequency hopping pattern, data in each time unit of the first period by using one of the N channels, and receiving, based on the second frequency hopping pattern, data in each time unit of the second period by using one of the N channels, the processing unit 1601 is specifically configured to:

perform circular shift on the first frequency hopping pattern and the second frequency hopping pattern based on the PCI; and control the communications unit 1602 to: receive, based on the first frequency hopping pattern obtained after the circular shift, data in each time unit of the first period by using one of the N channels, and receive, based on the second frequency hopping pattern obtained after the circular shift, data in each time unit of the second period by using one of the N channels.

It should be understood that the receive end device may be configured to implement the steps performed by the receive end device in the data transmission methods in the embodiments of this application. For related features, refer to the foregoing descriptions. Details are not described herein again.

An embodiment of this application further provides a computer storage medium. The computer storage medium is configured to store a computer software instruction used by the transmit end device or the receive end device shown in FIG. 4 to FIG. 12, and the computer software instruction includes program code designed for performing the foregoing method embodiments.

An embodiment of this application further provides a computer program product. The computer program product includes a computer software instruction, where the computer software instruction may be loaded by a processor to implement a method in the foregoing method embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), a computer readable storage medium, or a computer program product. Therefore, this application may use a form of hardware only embodiments, software only embodiments, or embodiments with a combination of software and hardware. They are collectively referred to as "modules" or "systems".

This application is described with reference to the flowcharts and/or block diagrams of the method, the apparatus (device), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions may also be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, clearly, various modifications and combinations may be made to them without departing from the spirit and scope of the present invention. Correspondingly, the specification and accompanying drawings are merely example descriptions of the present invention defined by the accompanying claims, and is considered as any of or all modifications, variations, combinations or equivalents that cover the scope of the present invention. Clearly, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A data communication method comprising:
determining a first frequency hopping pattern and a second frequency hopping pattern, wherein the first frequency hopping pattern and the second frequency hopping pattern comprises a same index set of N indexes corresponding to N channels; sending, based on the first frequency hopping pattern, data in each time unit of a first time period by using one of the N channels;
performing circular shift on the first frequency hopping pattern and the second frequency hopping pattern based on a physical cell identifier (PCI); and
after performing the circular shift, sending, based on the second frequency hopping pattern, data in each time unit of the second time period by using one of the N channels, wherein the first period and the second period are consecutive time periods each comprising N time units, each time unit starts and ends at starting times of two adjacent channels.

2. The method according to claim 1, wherein the first frequency hopping pattern and the second frequency hopping pattern are determined based on a permutation function, an input sequence of the permutation function, and a control word, wherein the input sequence of the permutation function is determined based on time information of a system, a PCI, and a quantity of channels, and a bit of the control word corresponding to a most significant bit of the input sequence of the permutation function is set to 0 when the quantity of channels is 16.

3. The method according to claim 2, wherein the first frequency hopping pattern and the second frequency hopping pattern satisfy a first equation expressed as:

$Y=\text{Perm5}(X,P)$, wherein

Y is an index of a channel in the first frequency hopping pattern or the second frequency hopping pattern, Perm5 (X,P) is a permutation function that permutes X based on P, X is an input sequence of the permutation function, P is a control word, and when the quantity of channels is 32, X satisfies a second equation and P satisfies a third equation, or when the quantity of channels is 16, X satisfies a fourth equation and P satisfies a fifth equation;

the second equation is expressed as:

$X=\text{mod}(b(\text{mSFN}_{4:0}\text{XorPCI}_{b:a})+\text{mSFN}_{9:5}, N)$, wherein X is the input sequence of the permutation function, mod( ) is a modulo function, b( ) is an initial sequence, $\text{mSFN}_{4:0}$ indicates selecting the fourth bit to the zeroth bit of the time information of the system, $\text{PCI}_{b:a}$ indicates that an $a^{th}$ bit to a $b^{th}$ bit of the PCI are selected, where $0 \le a < b \le 9$, and $\text{mSFN}_{9:5}$ indicates selecting the ninth bit to the fifth bit of the time information of the system;

the third equation is expressed as:

$P=\text{mSFN}_{9:5}+32*PCI$, wherein

P is the control word and PCI is the physical cell identifier;

the fourth equation is expressed as:

$$\begin{cases} X_{3:0} = \text{mod}(b(mSFN_{3:0}XorPCI_{b:a}) + mSFN_{7:4}, N) \\ X_4 = 0 \end{cases},$$

wherein $X_{3:0}$ is the third bit to the zeroth bit in the input sequence of the permutation function, $X_4$ is the fourth bit in the input sequence of the permutation function, $\text{mSFN}_{3:0}$ indicates selecting the third bit to the zeroth bit of the time information of the system, and $\text{mSFN}_{7:4}$ indicates selecting the seventh bit to the fourth bit of the time information of the system; and the fifth equation is expressed as:

$$\begin{cases} P_{\{13,12,11,9,6,5,2,0\}} = (mSFN_{9:4} * 8)XorPCI \\ P_{\{10,8,7,4,3\}} = 0 \end{cases},$$

wherein $P_{\{13,12,11,9,6,5,2,0\}}$ indicates selecting the thirteenth, twelfth, eleventh, ninth, sixth, fifth, second, and zeroth bits of the control word $P_{\{10,8,7,4,3\}}$ indicates selecting the tenth, eighth, seventh, fourth, and third bits of the control word, and $\text{mSFN}_{9:4}$ indicates selecting the ninth bit to the fourth bit of the time information of the system.

4. A data communication method comprising:
determining a first frequency hopping pattern and a second frequency hopping pattern, wherein the first frequency hopping pattern and the second frequency hopping pattern comprises a same index set of N indexes corresponding to N channels;
receiving, based on the first frequency hopping pattern, data in each time unit of a first time period by using one of the N channels; and
performing circular shift on the first frequency hopping pattern and the second frequency hopping pattern based on a physical cell identifier (PCI); and
after performing the circular shift, receiving, based on the second frequency hopping pattern, data in each time unit of a second time period by using one of the N channels, wherein the first period and the second period are consecutive time periods each comprising N time units, each time unit starts and ends at starting times of two adjacent channels.

5. The method according to claim 4, wherein the first frequency hopping pattern and the second frequency hopping pattern are determined based on a permutation function, an input sequence of the permutation function, and a control word, wherein the input sequence of the permutation function is determined based on time information of a system, a PCI, and a quantity of channels, and a bit of the control word corresponding to a most significant bit of the input sequence of the permutation function is set to 0 when the quantity of channels is 16.

6. The method according to claim 5, wherein the first frequency hopping pattern and the second frequency hopping pattern satisfy a first equation expressed as:

$Y=\text{Perm5}(X,P)$, wherein

Y is an index of a channel in the first frequency hopping pattern or the second frequency hopping pattern, Perm5 (X,P) is a permutation function that permutes X based on P, X is an input sequence of the permutation function, P is a control word, and when the quantity of channels is 32, X satisfies a second equation and P satisfies a third equation, or when the quantity of channels is 16, X satisfies a fourth equation and P satisfies a fifth equation;

the second equation is expressed as:

$X=\text{mod}(b(\text{mSFN}_{4:0} \text{XorPCI}_{b:a})+\text{mSFN}_{9:5}, N)$, wherein X is the input sequence of the permutation function, mod( ) is a modulo function, b( ) is an initial sequence, $\text{mSFN}_{4:0}$ indicates selecting the fourth bit to the zeroth bit of the time information of the system, $\text{PCI}_{b:a}$ indicates that an $a^{th}$ bit to a $b^{th}$ bit of the PCI are selected, where $0 \leq a < b \leq 9$, and $\text{mSFN}_{9:5}$ indicates selecting the ninth bit to the fifth bit of the time information of the system;

the third equation is expressed as:

$P=\text{mSFN}_{9:5}+32*PCI$, wherein

P is the control word and PCI is the physical cell identifier;

the fourth equation is expressed as:

$$\left\{ \begin{array}{l} X_{3:0} = \text{mod}(b(\text{mSFN}_{3:0} \text{XorPCI}_{b:a}) + \text{mSFN}_{7:4}, N) \\ X_4 = 0 \end{array} \right\},$$

wherein $X_{3:0}$ is the third bit to the zeroth bit in the input sequence of the permutation function, $X_4$ is the fourth bit in the input sequence of the permutation function, $\text{mSFN}_{3:0}$ indicates selecting the third bit to the zeroth bit of the time information of the system, and $\text{mSFN}_{7:4}$ indicates selecting the seventh bit to the fourth bit of the time information of the system; and the fifth equation is expressed as:

$$\left\{ \begin{array}{l} P_{\{13,12,11,9,6,5,2,0\}} = (\text{mSFN}_{9:4} * 8) XorPCI \\ P_{\{10,8,7,4,3\}} = 0 \end{array} \right\},$$

wherein $P_{\{13,12,11,9,6,5,2,0\}}$ indicates selecting the thirteenth, twelfth, eleventh, ninth, sixth, fifth, second, and zeroth bits of the control word $P_{\{10,8,7,4,3\}}$ indicates selecting the tenth, eighth, seventh, fourth, and third bits of the control word, and $\text{mSFN}_{9:4}$ indicates selecting the ninth bit to the fourth bit of the time information of the system.

7. A data communication apparatus, comprising at least one processor and a transceiver, and a non-transitory computer-readable storage medium coupled to the at least one processor and storing programming instructions for execution by the at least one processor, the programming instructions instruct the at least one processor to: determine a first frequency hopping pattern and a second frequency hopping pattern, wherein the first frequency hopping pattern and the second frequency hopping pattern comprises a same index set of N indexes corresponding to N channels; and cause the transceiver to:

send, based on the first frequency hopping pattern determined by the processor, data in each time unit of a first time period by using one of the N channels;

perform circular shift on the first frequency hopping pattern and the second frequency hopping pattern based on a physical cell identifier (PCI); and after performing the circular shift, send, based on the second frequency hopping pattern determined by the processor, data in each time unit of a second time period by using one of the N channels, wherein the first period and the second period are consecutive time periods each comprising N time units, each time unit starts and ends at starting times of two adjacent channels.

8. The apparatus according to claim 7, wherein the first frequency hopping pattern and the second frequency hopping pattern are determined based on a permutation function, an input sequence of the permutation function, and a control word, wherein the input sequence of the permutation function is determined based on time information of a system, a PCI, and a quantity of channels, and a bit of the control word corresponding to a most significant bit of the input sequence of the permutation function is set to 0 when the quantity of channels is 16.

9. The apparatus according to claim 8, wherein the first frequency hopping pattern and the second frequency hopping pattern satisfy a first equation expressed as:

$Y=\text{Perm5}(X,P)$, wherein

Y is an index of a channel in the first frequency hopping pattern or the second frequency hopping pattern, Perm5 (X,P) is a permutation function that permutes X based on P, X is an input sequence of the permutation function, P is a control word, and when the quantity of channels is 32, X satisfies a second equation and P satisfies a third equation, or when the quantity of channels is 16, X satisfies a fourth equation and P satisfies a fifth equation;

the second equation is expressed as:

$X=\text{mod}(b(\text{mSFN}_{4:0} \text{XorPCI}_{b:a})+\text{mSFN}_{9:5}, N)$, wherein X is the input sequence of the permutation function, mod( ) is a modulo function, b( ) is an initial sequence, $\text{mSFN}_{4:0}$ indicates selecting the fourth bit to the zeroth bit of the time information of the system, $\text{PCI}_{b:a}$ indicates that an $a^{th}$ bit to a $b^{th}$ bit of the PCI are selected, where $0 \leq a < b \leq 9$, and $\text{mSFN}_{9:5}$ indicates selecting the ninth bit to the fifth bit of the time information of the system;

the third equation is expressed as:

$P = mSFN_{9:5} + 32*PCI$, wherein

P is the control word and PCI is the physical cell identifier;

the fourth equation is expressed as:

$$\begin{cases} X_{3:0} = \mod(b(mSFN_{3:0} XorPCI_{b:a}) + mSFN_{7:4}, N) \\ X_4 = 0 \end{cases},$$

wherein $X_{3:0}$ is the third bit to the zeroth bit in the input sequence of the permutation function, $X_4$ is the fourth bit in the input sequence of the permutation function, $mSFN_{3:0}$ indicates selecting the third bit to the zeroth bit of the time information of the system, and $mSFN_{7:4}$ indicates selecting the seventh bit to the fourth bit of the time information of the system; and the fifth equation is expressed as:

$$\begin{cases} P_{\{13,12,11,9,6,5,2,0\}} = (mSFN_{9:4} * 8) XorPCI \\ P_{\{10,8,7,4,3\}} = 0 \end{cases},$$

wherein $P_{\{13,12,11,9,6,5,2,0\}}$ indicates selecting the thirteenth, twelfth, eleventh, ninth, sixth, fifth, second, and zeroth bits of the control word $P_{\{10,8,7,4,3\}}$ indicates selecting the tenth, eighth, seventh, fourth, and third bits of the control word, and $mSFN_{9:4}$ indicates selecting the ninth bit to the fourth bit of the time information of the system.

10. A data communication apparatus, comprising at least one processor and a transceiver, and a non-transitory computer-readable storage medium coupled to the at least one processor and storing programming instructions for execution by the at least one processor, the programming instructions instruct the at least one processor to: determine a first frequency hopping pattern and a second frequency hopping pattern, wherein the first frequency hopping pattern and the second frequency hopping pattern comprises a same index set of N indexes corresponding to N channels; and cause the transceiver to:

receive, based on the first frequency hopping pattern determined by the processor, data in each time unit of a first time period by using one of the N channels;

perform circular shift on the first frequency hopping pattern and the second frequency hopping pattern based on a physical cell identifier (PCI); and after performing the circular shift, receive, based on the second frequency hopping pattern determined by the processor, data in each time unit of a second time period by using one of the N channels, wherein the first period and the second period are consecutive time periods each comprising N time units, each time unit starts and ends at starting times of two adjacent channels.

11. The apparatus according to claim 10, wherein the first frequency hopping pattern and the second frequency hopping pattern are determined based on a permutation function, an input sequence of the permutation function, and a control word, wherein the input sequence of the permutation function is determined based on time information of a system, a PCI, and a quantity of channels, and a bit of the control word corresponding to a most significant bit of the input sequence of the permutation function is set to 0 when the quantity of channels is 16.

12. The apparatus according to claim 11, wherein the first frequency hopping pattern and the second frequency hopping pattern satisfy a first equation expressed as:

$Y = Perm5(X,P)$, wherein

Y is an index of a channel in the first frequency hopping pattern or the second frequency hopping pattern, Perm5 (X,P) is a permutation function that permutes X based on P, X is an input sequence of the permutation function and is determined based on the time information of the system, the physical cell identifier PCI and the quantity of channels, P is a control word, and when the quantity of channels is 32, X satisfies a second equation and P satisfies a third equation, or when the quantity of channels is 16, X satisfies a fourth equation and P satisfies a fifth equation;

the second equation is expressed as:

$X = \mod(b(mSFN_{4:0} XorPCI_{b:a}) + mSFN_{9:5}, N)$, wherein

X is the input sequence of the permutation function, mod( ) is a modulo function, b( ) is an initial sequence, $mSFN_{4:0}$ indicates selecting the fourth bit to the zeroth bit of the time information of the system, $PCI_{b:a}$ indicates that an $a^{th}$ bit to a $b^{th}$ bit of the PCI are selected, where $0 \le a < b \le 9$, and $mSFN_{9:5}$ indicates selecting the ninth bit to the fifth bit of the time information of the system;

the third equation is expressed as:

$P = mSFN_{9:5} + 32*PCI$, wherein

P is the control word and PCI is the physical cell identifier;

the fourth equation is expressed as:

$$\begin{cases} X_{3:0} = \mod(b(mSFN_{3:0} XorPCI_{b:a}) + mSFN_{7:4}, N) \\ X_4 = 0 \end{cases},$$

wherein $X_{3:0}$ is the third bit to the zeroth bit in the input sequence of the permutation function, $X_4$ is the fourth bit in the input sequence of the permutation function, $mSFN_{3:0}$ indicates selecting the third bit to the zeroth bit of the time information of the system, and $mSFN_{7:4}$ indicates selecting the seventh bit to the fourth bit of the time information of the system; and the fifth equation is expressed as:

$$\begin{cases} P_{\{13,12,11,9,6,5,2,0\}} = (mSFN_{9:4} * 8) XorPCI \\ P_{\{10,8,7,4,3\}} = 0 \end{cases},$$

wherein $P_{\{13,12,11,9,6,5,2,0\}}$ indicates selecting the thirteenth, twelfth, eleventh, ninth, sixth, fifth, second, and zeroth bits of the control word $P_{\{10,8,7,4,3\}}$ indicates selecting the tenth, eighth, seventh, fourth, and third bits of the control word, and $mSFN_{9:4}$ indicates selecting the ninth bit to the fourth bit of the time information of the system.

* * * * *

UNITED STATES PATENT AND TRADEMARK OFFICE
CERTIFICATE OF CORRECTION

| | | |
|---|---|---|
| PATENT NO. | : 11,368,187 B2 | Page 1 of 1 |
| APPLICATION NO. | : 16/883233 | |
| DATED | : June 21, 2022 | |
| INVENTOR(S) | : Zhenyu Li et al. | |

It is certified that error appears in the above-identified patent and that said Letters Patent is hereby corrected as shown below:

In the Claims

Column 24/Line 48 - In Claim 3, delete "word" and insert -- word, --.

Column 25/Line 24 - In Claim 6, delete "word," and insert -- word; --.

Column 25/Line 55-56 (Approx.) - In Claim 6, delete "third bit to the zeroth bit" and insert -- least significant four bits --.

Column 26/Line 4 - In Claim 6, delete "word" and insert -- word, --.

Column 27/Line 6 - In Claim 9, delete "is expressed as:" and insert -- is: --.

Column 27/Line 31 (Approx.) - In Claim 9, delete "word" and insert -- word, --.

Column 28/Line 15 (Approx.) - In Claim 12, delete "PCI" and insert -- PCI, --.

Column 28/Line 61 - In Claim 12, delete "word" and insert -- word, --.

Signed and Sealed this
Twenty-fifth Day of October, 2022

Katherine Kelly Vidal
*Director of the United States Patent and Trademark Office*